May 23, 1961 P. S. BEMIS 2,985,871
ELECTRIC PROTECTION SYSTEM
Filed Sept. 17, 1958 13 Sheets-Sheet 1

May 23, 1961 P. S. BEMIS 2,985,871
ELECTRIC PROTECTION SYSTEM
Filed Sept. 17, 1958 13 Sheets-Sheet 3

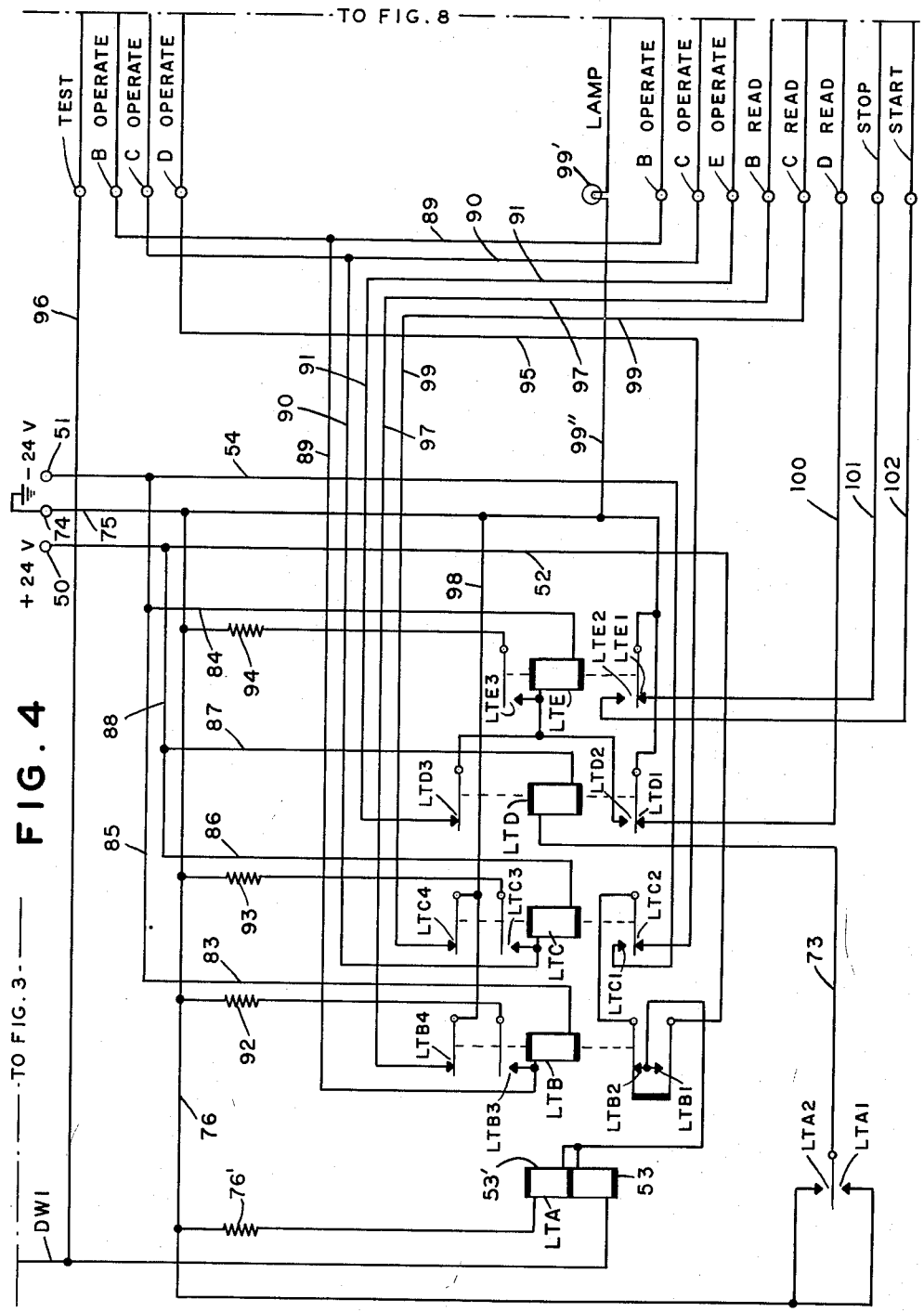

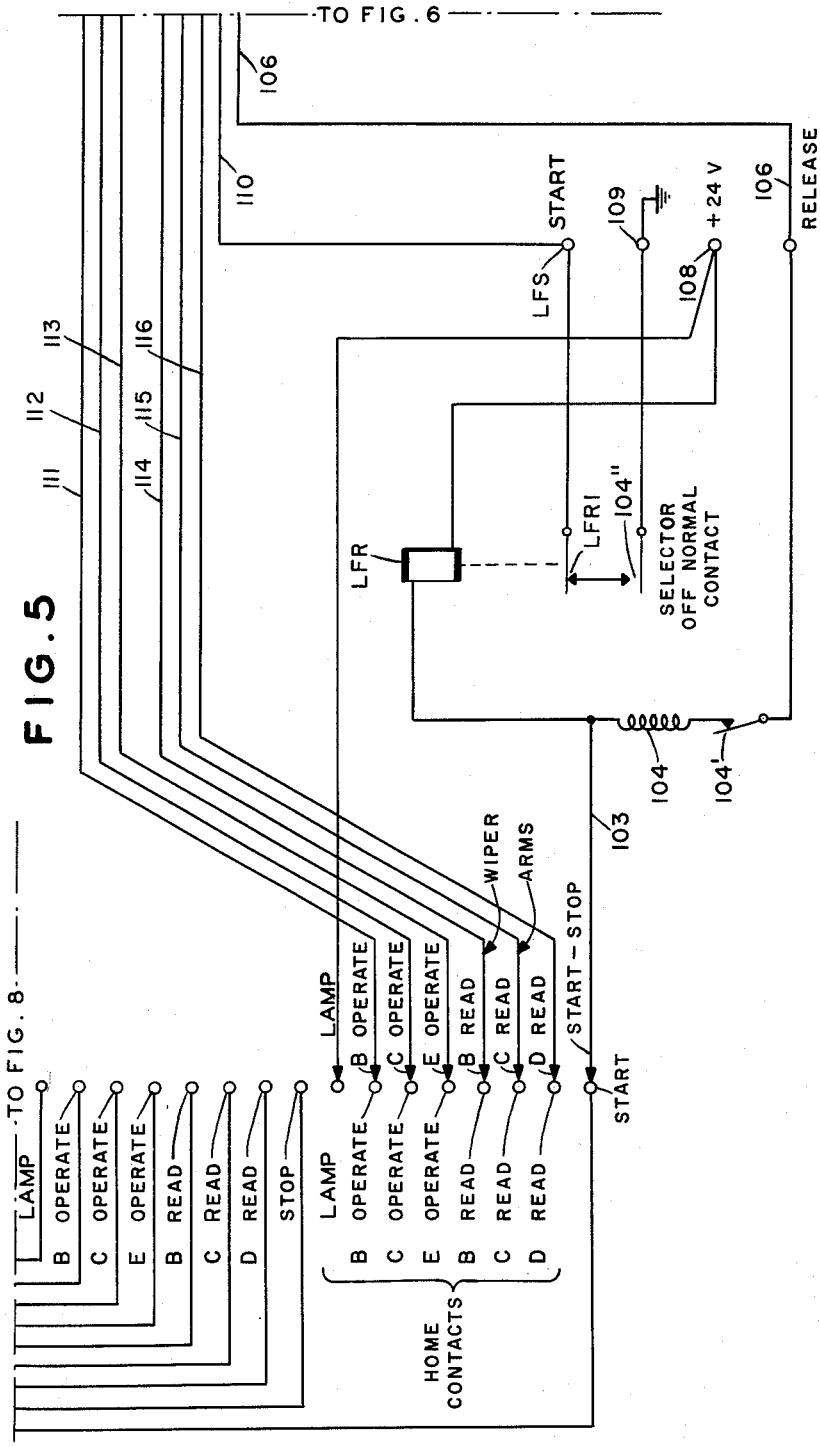

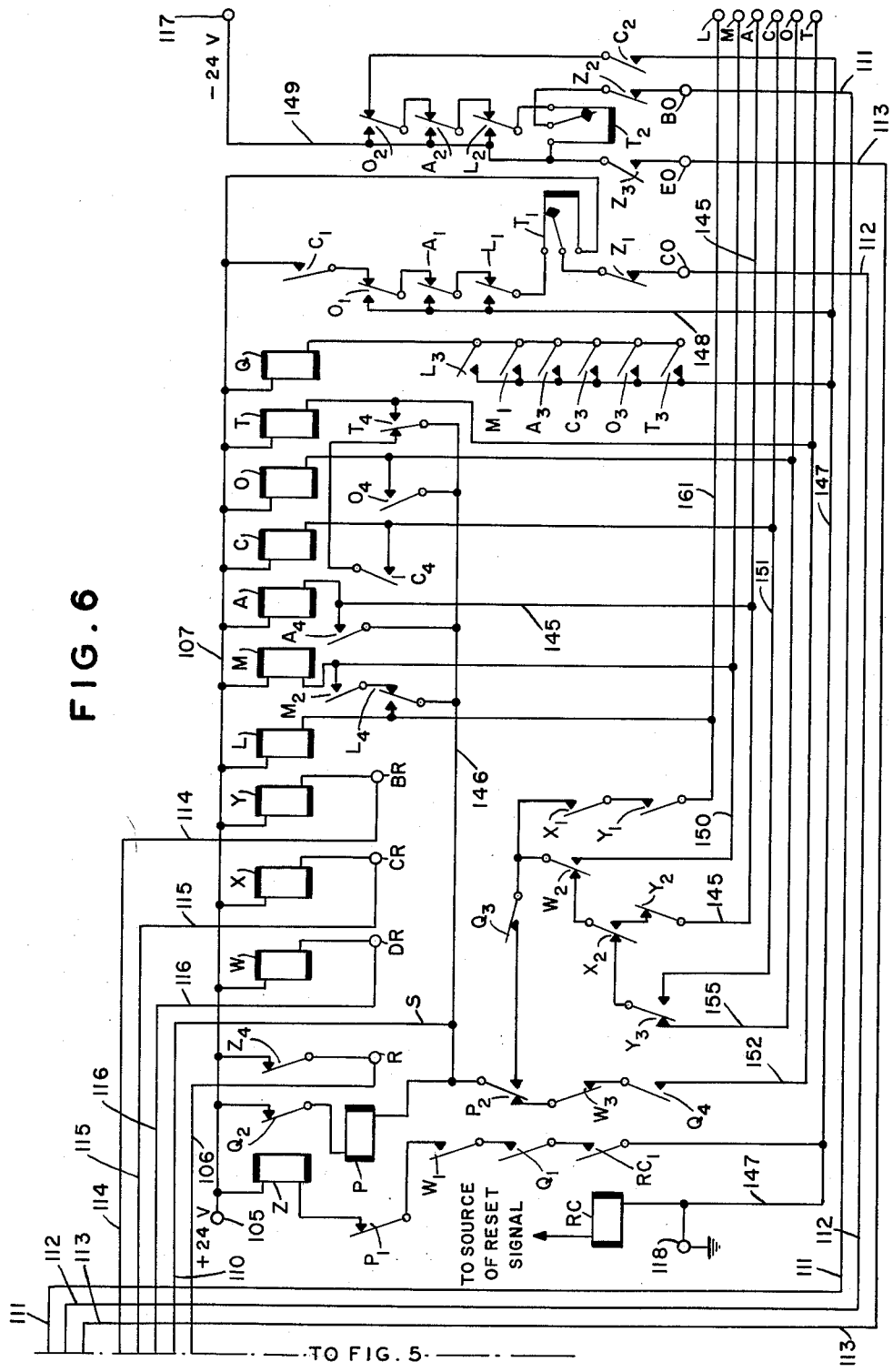

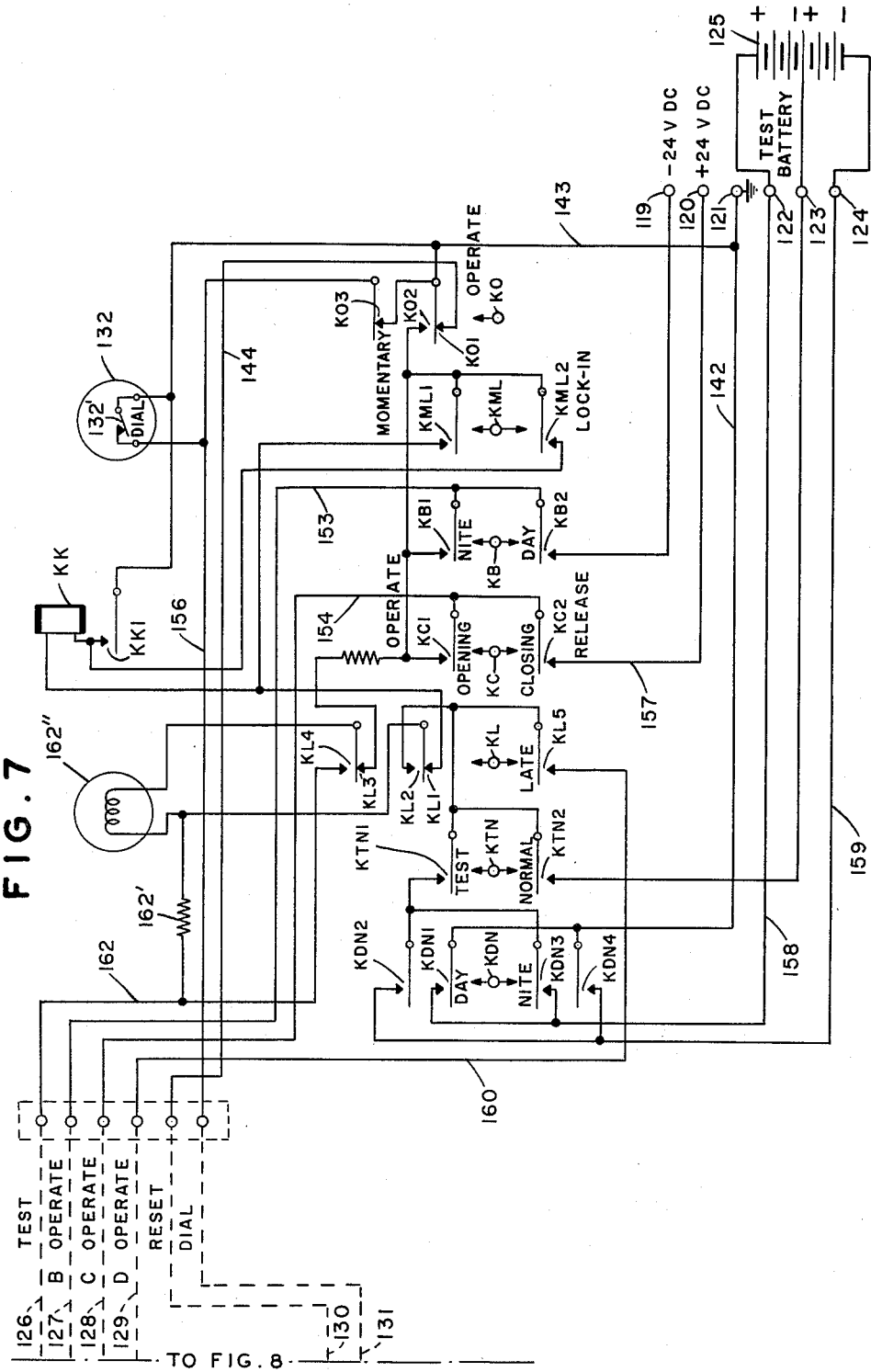

May 23, 1961  P. S. BEMIS  2,985,871
ELECTRIC PROTECTION SYSTEM
Filed Sept. 17, 1958  13 Sheets-Sheet 8
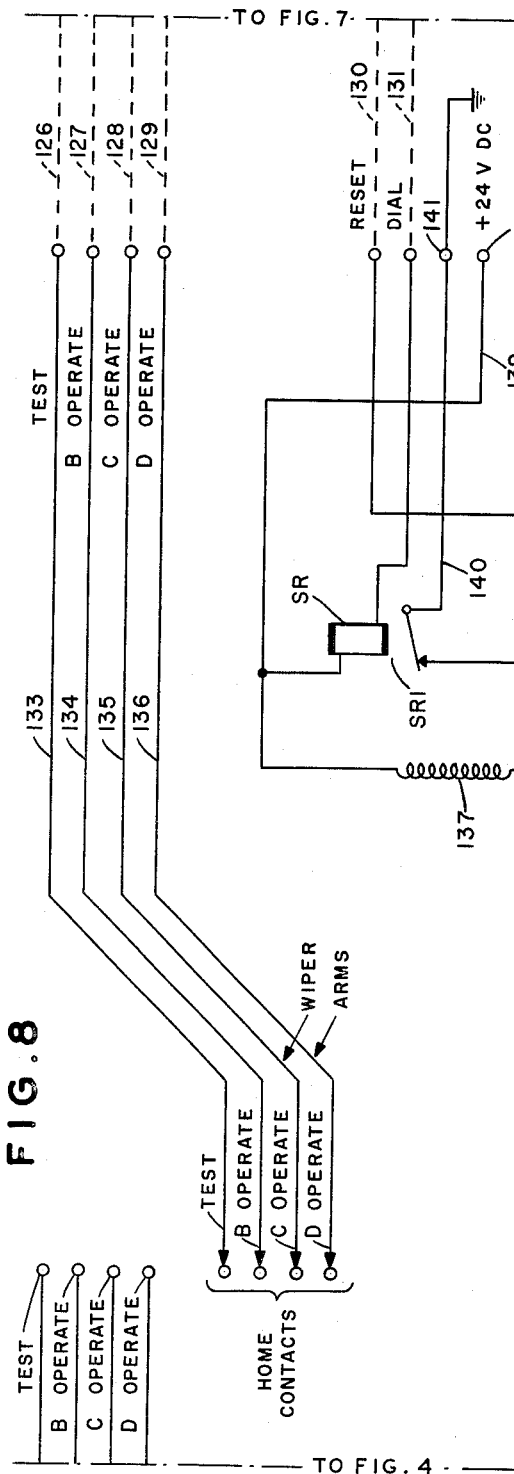
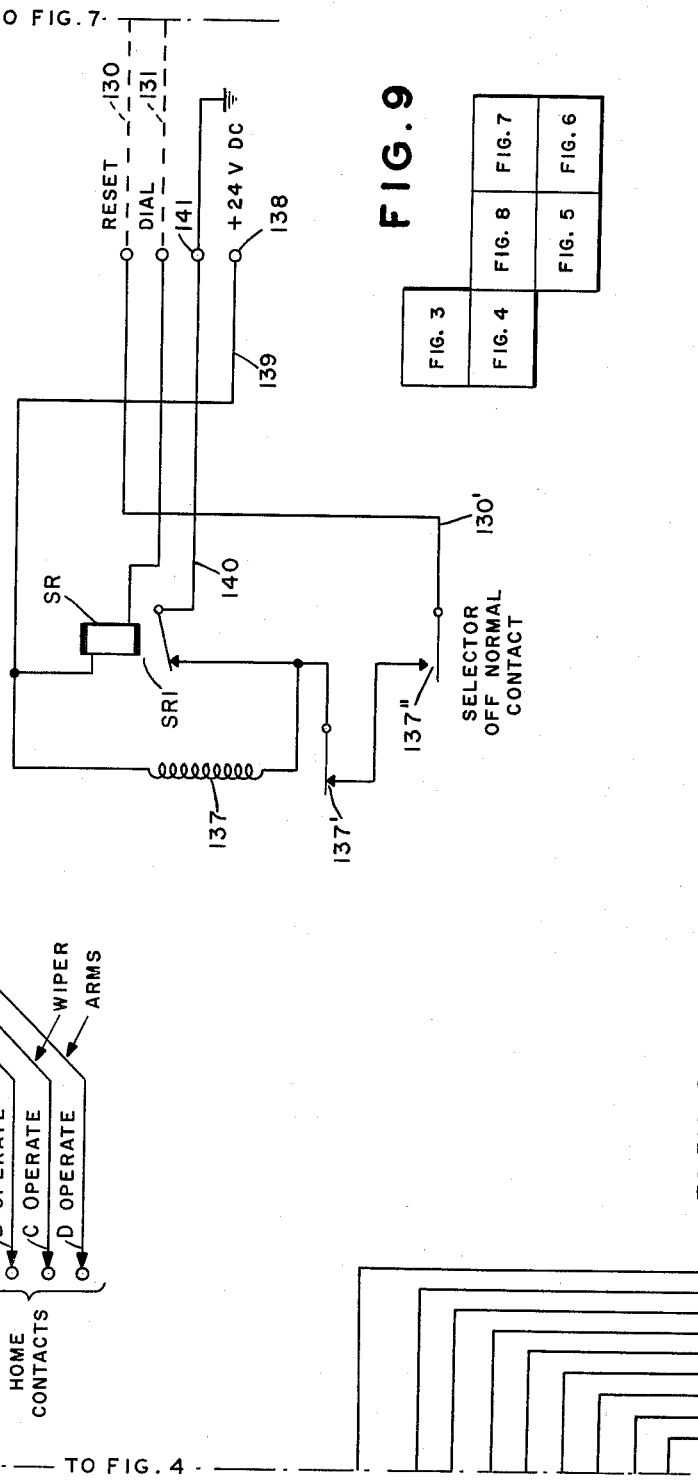

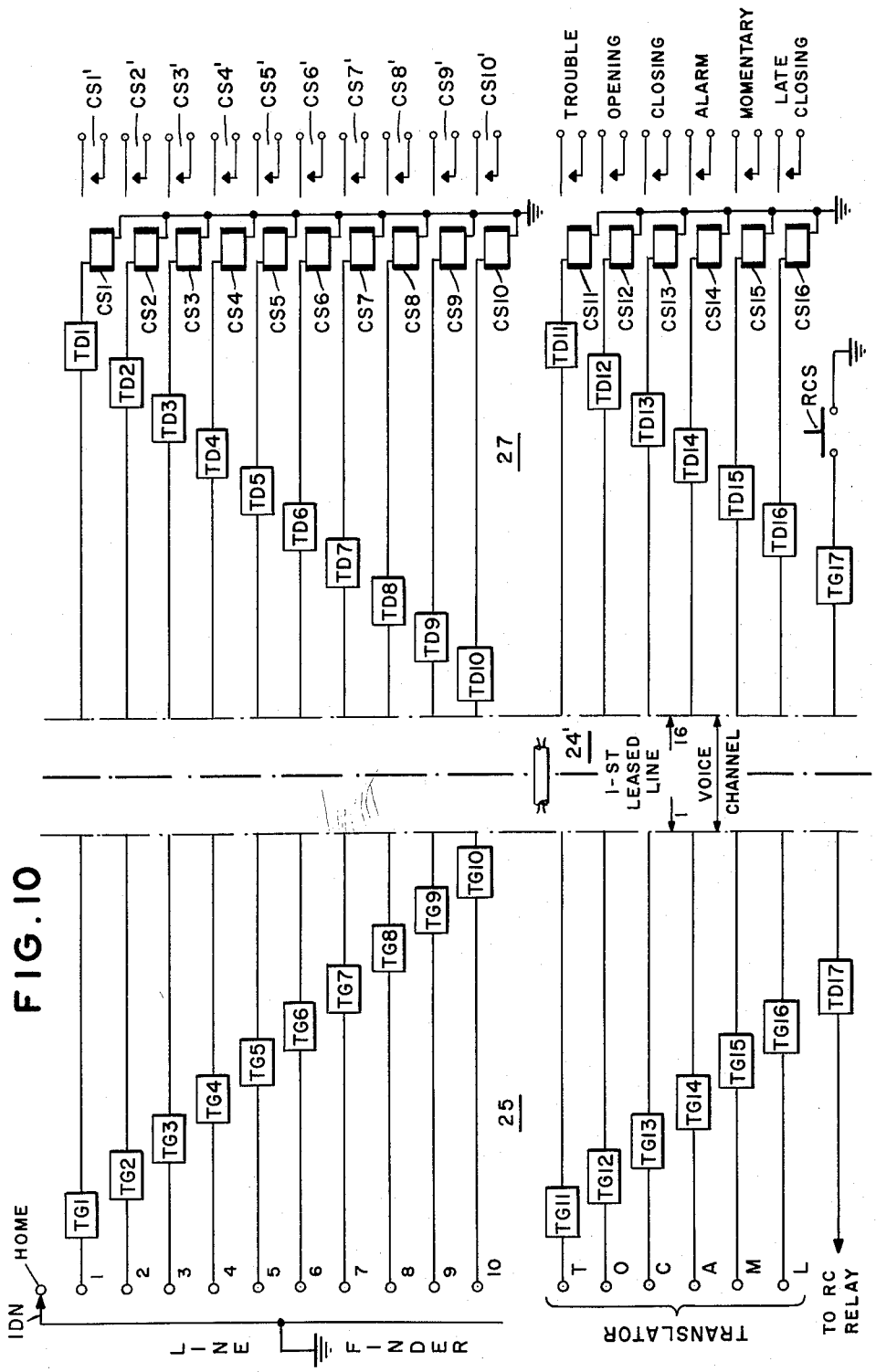

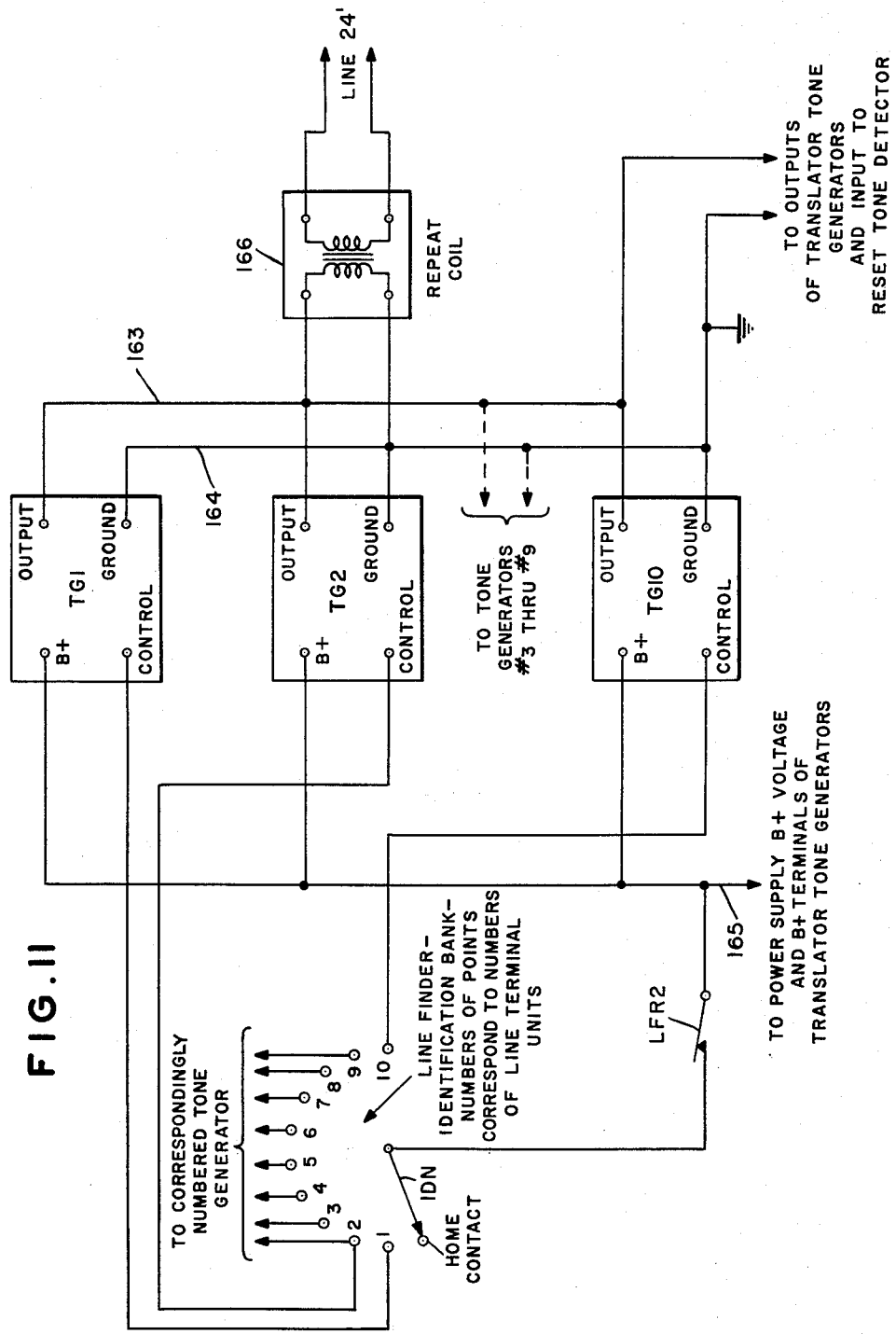

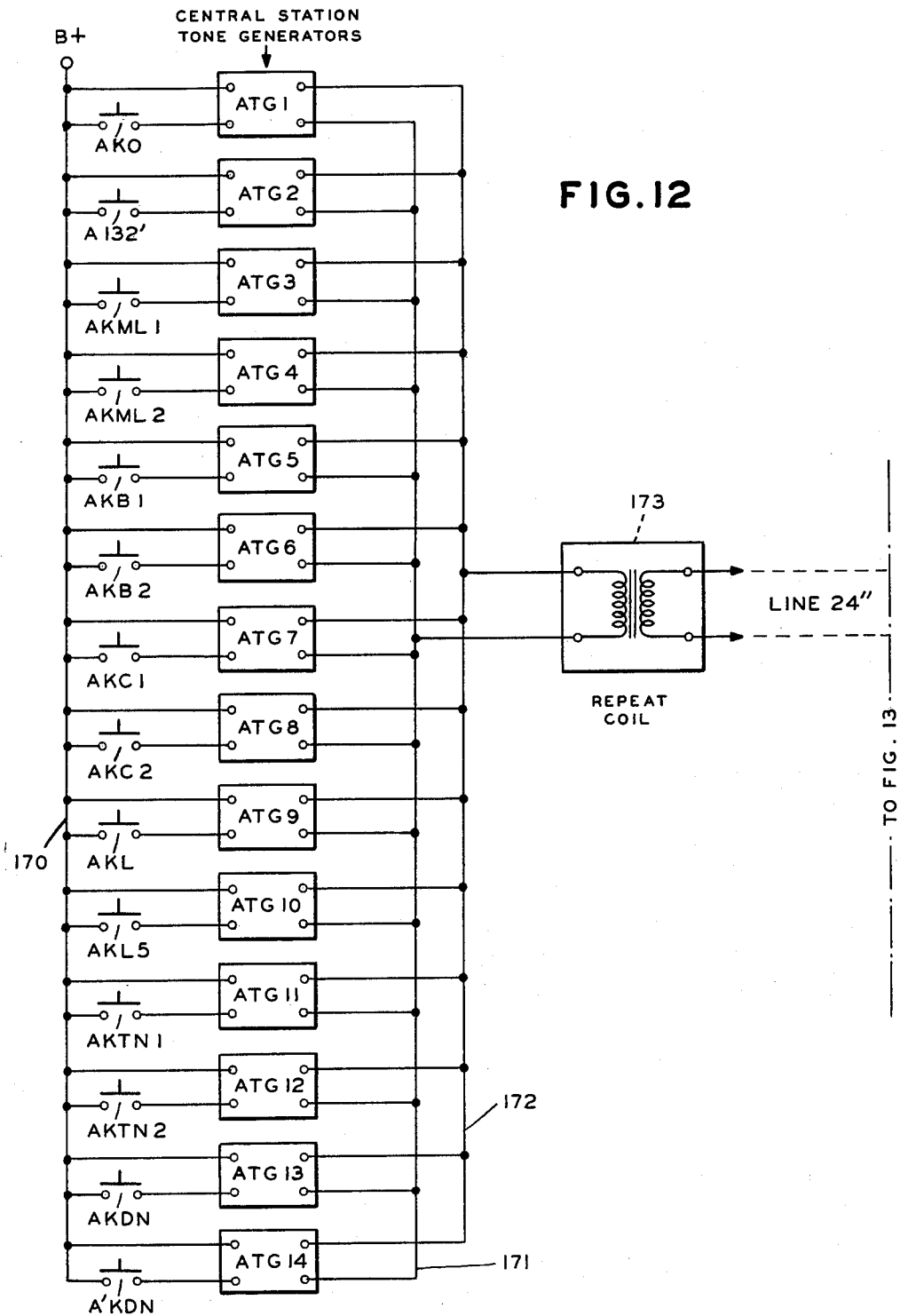

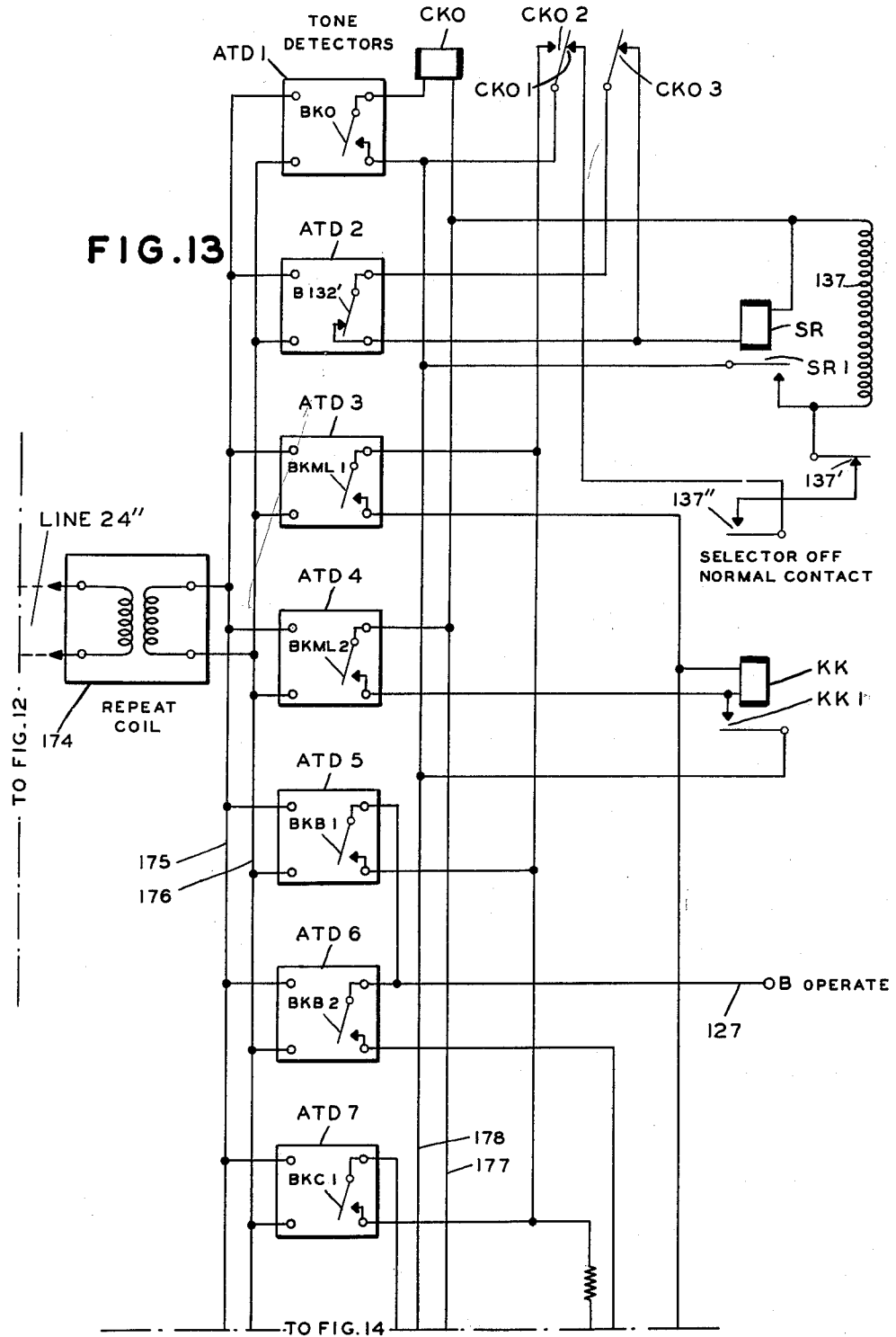

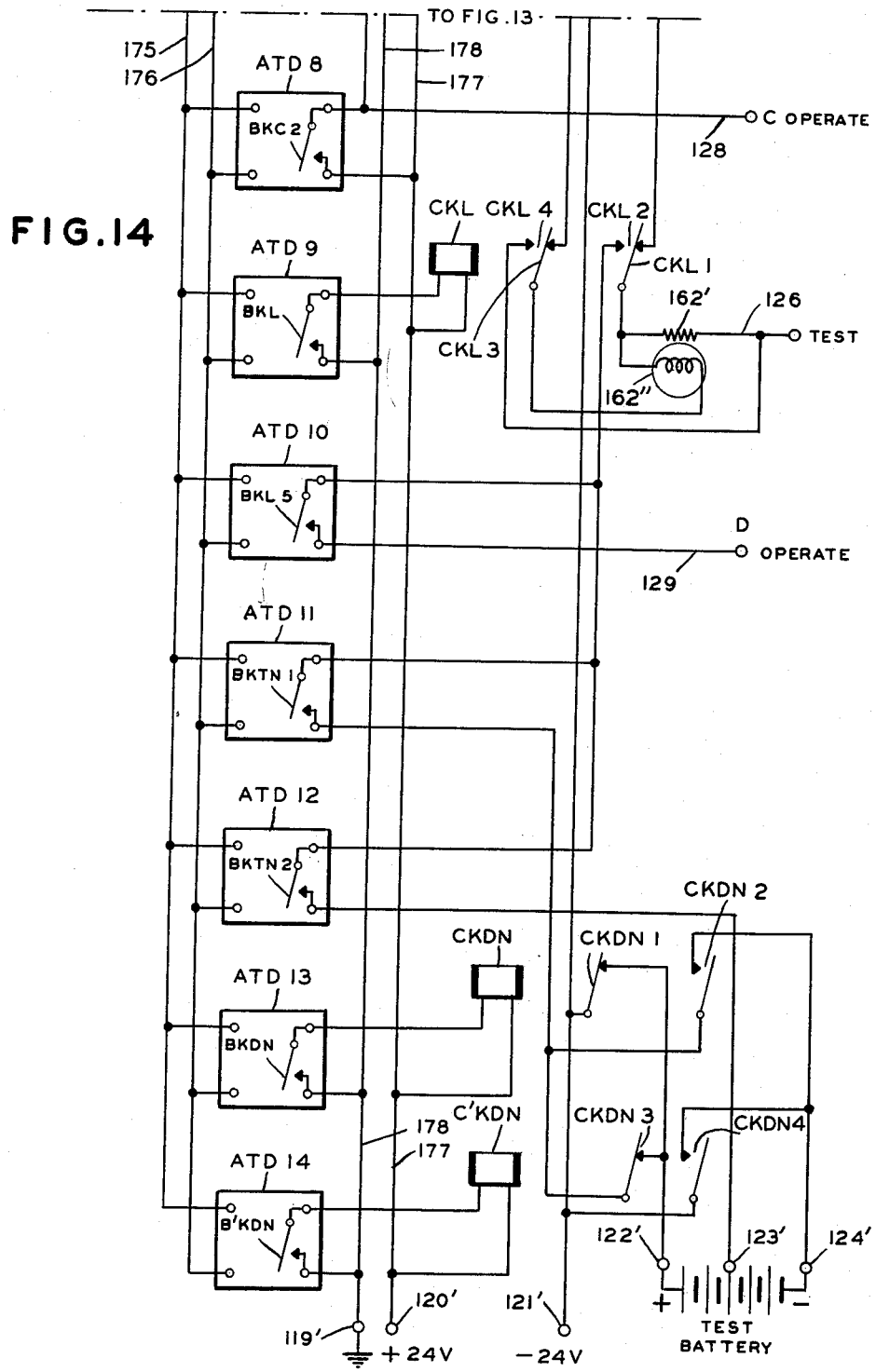

United States Patent Office 2,985,871
Patented May 23, 1961

2,985,871

ELECTRIC PROTECTION SYSTEM

Philo S. Bemis, Canoga Park, Calif., assignor to American District Telegraph Company, Jersey City, N.J., a corporation of New Jersey Filed Sept. 17, 1958, Ser. No. 761,564

24 Claims. (Cl. 340—286)

The present invention relates to electric protection systems and more particularly to electric protection systems of the type in which electrical signal indications of occurrences in a number of separate premises are transmitted to a central station where they are acted on in an appropriate manner by supervisory personnel.

A variety of devices have been and are being employed in the protection of life and property from such perils as burglary, holdup and fire. Other devices have been and are being employed for purposes such as the supervision of watchmen, the supervision of sprinkler systems and the supervision of industrial processes. Such devices may be employed to provide alarm signal indications locally at the protected premises and/or at a remote central station where highly trained personnel are available to interpret and act upon the electrical signal indications of occurrences at a large number of protected premises. Efficient operation of many protection devices requires also the transmission of signals to the protected premises, for example, for effecting periodic tests to insure the integrity of the protection system.

In providing central station protective service, it is necessary that information orginating in many separate areas be communicated to a central station for processing. While this may be accomplished over any desired communication channel, this has in general been done through the use of direct wire connections and usually through wire facilities leased from local telephone companies. As the distance between the central station and a protected premises increases, the rental or maintenance cost of a direct wire circuit becomes higher until finally, at some distance which is usually of the order of 10-15 miles for most classes of service, the cost becomes prohibitive as compared with the charge which may economically be made for the protection service.

It has been suggested that the cost of providing wire connections may be reduced by the grouping of protection systems, and such grouping has been and is in use. For example, the so-called McCulloh circuit, as exemplified in United States Patents Nos. 253,080, 2,254,398 and 2,398,594, provides a grouping in which a number of systems can use a single direct wire circuit. Because of electrical limitations and operational considerations in these prior grouping arrangements, the number of systems which one direct wire can serve is limited to a relatively small number. This limitation in grouping has prevented the cost of connecting facilities from being shared by a sufficient number of subscribers, i.e., individual protection systems, to render a distant operation economically feasible.

Another problem in connection with rendering a central station protection service is the problem of efficient operation of the central station itself. Thus a central station receives a large number of electrical signals, but only a very small proportion of those are of an emergency character which requires immediate attention. For example, in supervising watchmen, signals are receiving periodically from each watchman indicating the completion of an appointed tour, but only the absence of a signal at a particular time is an emergency condition requiring attention. In burglar alarm service, signals are received at the times of opening and closing of each subscriber's premises, but normally such signals are routine so that in the great majority of cases no emergency action is required. In other words, in the operation of a central station the great majority of signals are of a routine character which do not need special attention. However, such signals have heretofore required the attention of an operator despite the fact that no emergency action was required.

At the present time there are three principal economic factors involved in rendering central station protection service for a particular area, namely, the cost involved in maintaining a guard force, the cost of operation within the central station and the cost of wire facilities for connecting the subscribers' premises and the central station. In extending service to an area remote from an existing central station, the cost of wire facilities is the most significant, since if this cost is excessive the small subscribed cannot afford the service and there will not be a sufficient density of service demand to warrant the maintenance of a guard force in the area. This problem is of significance where the total service demand in the remote area is insufficient to warrant the establishment of a local central station.

In accordance with the invention, central station service may be extended to such areas remote from a central station by the provision of efficient, economical and reliable common trunking facilities including common apparatus for performing certain central station operations in the remote area. When the total service area of a central station is expanded in this way beyond the area which can be served with conventional direct wire service, the size and efficiency of the central stations become factors of considerable importance. Efficient and satisfactory operation of a central station is very difficult to obtain when the size of the station and the complexity of the human operations involved exceed a reasonable amount. Thus to extend central station service to remote areas around a central station, not only must the cost of wire facilities be kept to a minimum, but also the operating efficiency of the central station itself should be increased.

A principal object of the present invention has been the provision of a novel and improved central station electric protection system.

More particularly, it has been an object of the invention to provide a novel and improved central station electric protection system in which the cost of wire facilities is minimized and in which the efficiency of operation of the central station is maximized.

Another object of the invention has been the provision of a novel and improved method of transmitting and handling electrical signal indications of occurrences at protected premises included in a central station electrical protection system.

Still another object of the invention has been the provision of novel and improved apparatus for transmitting and handling electrical signal indications of occurrences at protected premises included in a central station electrical protection system.

Another object of the invention has been the provision of a novel and improved method and apparatus for transmitting and handling burglar alarm signals in a central station electrical protection system.

A feature of the invention has been the provision of apparatus for determining and logically resetting the protection condition of a protected premises in a central station electrical protection system.

Other and further objects, features and advantages of the invention will be apparent from the following description of the invention.

As has been mentioned previously, the principles of the invention are generally applicable to the various classes of service provided in a central station electrical protection system. These classes of service include burglary, fire, holdup and waterflow detection, watchmen's supervision and industrial process supervision. The most complicated of these from the point of view of electrical signals involved and conditions of service to be established from time to time is the burglary detection service. This class of service has therefore been selected for providing a detailed description of the invention. This detailed description will now be set forth in connection with the accompanying drawings, in which:

Fig. 4 is a circuit diagram of a line terminal unit for use in the system of Fig. 1;

Fig. 5 is a circuit diagram of a line finder and identifier unit for use in the system of Fig. 1;

Fig. 6 is a circuit diagram of a translator unit for use in the system of Fig. 1;

Fig. 7 is a circuit diagram of a control panel for use as the operator key board or the dispatcher key board in the system of Fig. 1;

Fig. 8 is a circuit diagram of a selector unit for use in the system of Fig. 1;

Fig. 9 is a diagram illustrating the arrangement of Figs. 3-8 to form a system circuit diagram;

Fig. 10 is a diagrammatic illustration of a subscriber identifying and transmission arrangement suitable for use in connection with the circuit of Figs. 3-8;

Fig. 11 is a circuit diagram, partially in block form, illustrating a portion of Fig. 10; and Figs. 12, 13 and 14, when joined along the lines indicated in these drawings, is a circuit diagram of a signalling system for transmitting signals from the central station to the individual line terminal units.

Figure 1:
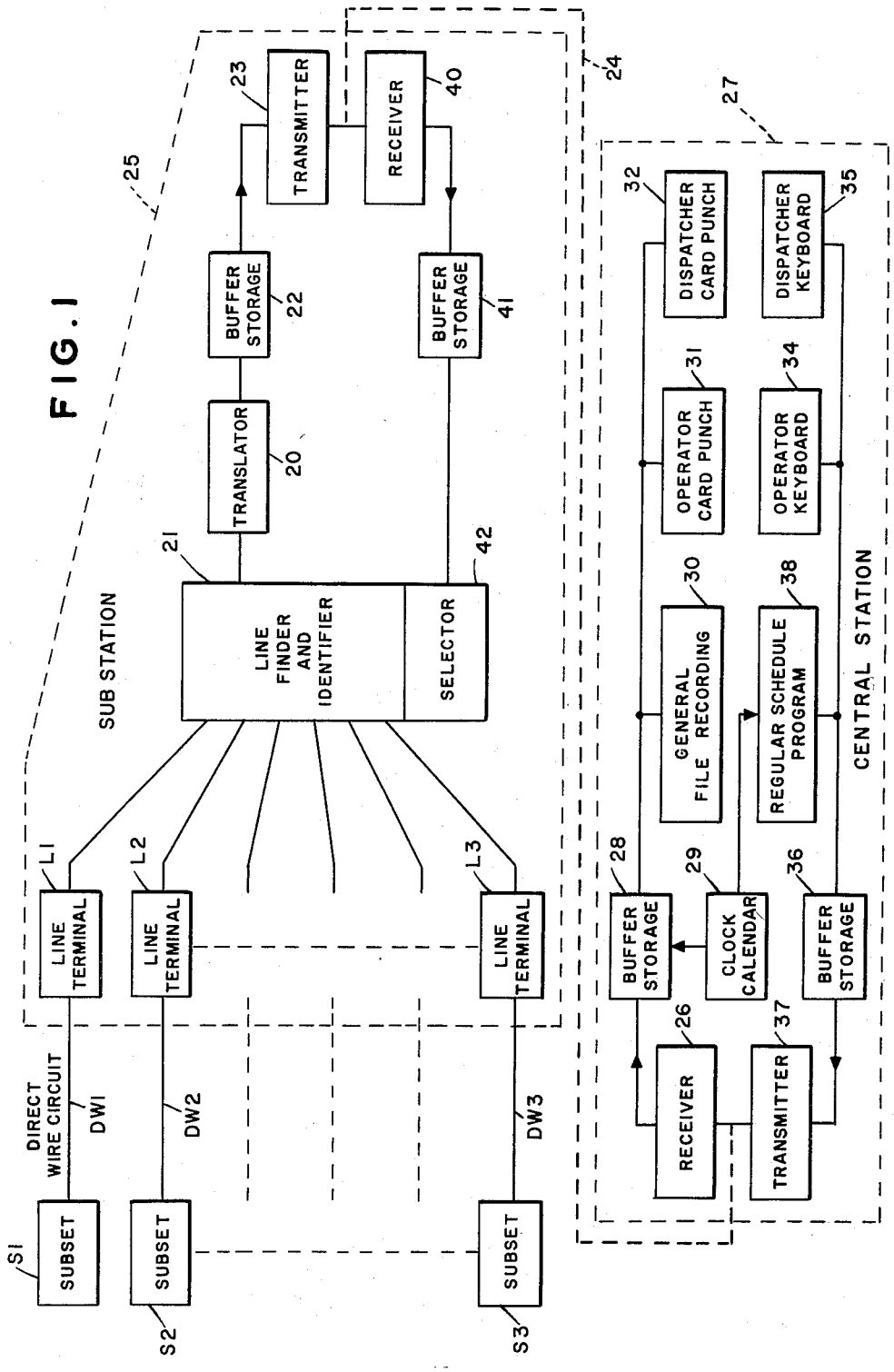
Fig. 1 is a functional block diagram of a central station automatic burglar alarm system in accordance with the invention.

Referring now to the drawings and more particularly to Fig. 1, the elements S1, S2 and S3 are subscribers' subsets, each of which is located at the premises of a particular subscriber. While there will of course be a large number of subscribers, for convenience only three have been illustrated. While the actual protection equipment at each subscriber's premises may be different, the subsets may be identical, although this is not necessarily the case. The subsets serve as terminations for the local protection circuits, for the central station connections and for control signalling.

Each subset S1, S2, S3, etc. is connected to a respective line terminal unit L1, L2, L3, etc. through a respective direct wire circuit DW1, DW2, DW3, etc. The direct wire circuit may be a pair of wires, such as an ordinary telephone circuit, or a single wire and ground return. Each line terminal has a number of output and input terminals which are adapted to be connected to corresponding terminals in a translator unit 20 by a line finder and identifier 21. The line terminal units may also provide appropriate signals for identifying the associated line.

The translator 20 checks the condition of a line terminal unit, makes a decision as to the type of occurrence which has taken place, presents that decision in an electrical form which can be supplied to a buffer storage device 22, resets the line terminal unit to the next logical state and then, before releasing itself, checks to see that all of the operations have been properly performed.

The buffer storage unit 22, and the other buffer storage units to be described, are employed to store information so that preceding equipment can be released to process the next group of information. They are not necessary to the operation of the system and hence, for simplicity, are omitted from the circuits of Figs. 3-8. The buffer storage units may be of any convenient type such as magnetic tapes or electronic storage devices.

The information stored in the buffer storage unit 22 is read out by a transmitter or reader device 23 which also puts the information on a two-way communication channel 24. The channel 24 might be a radio link but will usually be two one-way telephone trunks or a two-way telephone trunk. For reliability of service, the channel 24 will usually be duplicated.

The line terminal units, the line finder 21, the translator 20, the buffer storage unit 22 and the transmitter 23 form part of a single assembly shown by the dotted line 25 and which is designated a "substation." The substation 25 will normally be located at some place near the subscribers' premises which are connected thereto.

Signals delivered to the channel 24 by the transmitter 23 are received by a receiver 26 which is located at the central station 27. The signals are supplied to a buffer storage unit 28. Information with respect to time and date may be added to the signals at the time of storage by a clock calendar 29.

The output from the buffer storage unit 28 is supplied to a general file recording device 30 and to an operator's card punch device 31 or a dispatcher's card punch device 32. The devices 30, 31 and 32 may be of any convenient type such as an International Business Machines Corporation summary card punch. Suitable machines are described in detail in United States Patents Nos. 2,062,118 to Bryce et al. and 2,506,470 to Roth et al.

The functions of the devices 30, 31 and 32 could be combined, if desired, so that only a single device is required. The IBM summary card punch is a device which will hold a stack of blank cards and, by having information fed into it from auxiliary equipment, punch the cards accordingly. The device 30 is intended for the recording of all incoming information including that which does not require action, such as the proper and timely opening or closing of a protected premises or the receipt of a watchman's tour signal. The devices 31 and 32 are intended for information which does require action. Depending upon the volume of traffic a single operator with a single device may be employed or more than two operators and more than two devices can be used. A convenient distribution for a large central station might involve two operators, as shown. One, termed the "operator" might handle variations in regular schedules that take place, such as irregular openings, late closings, and watchman delinquencies. The other, termed the "dispatcher" might handle alarms, troubles and communications with guards, repairmen, and police and fire departments.

Figure 2:
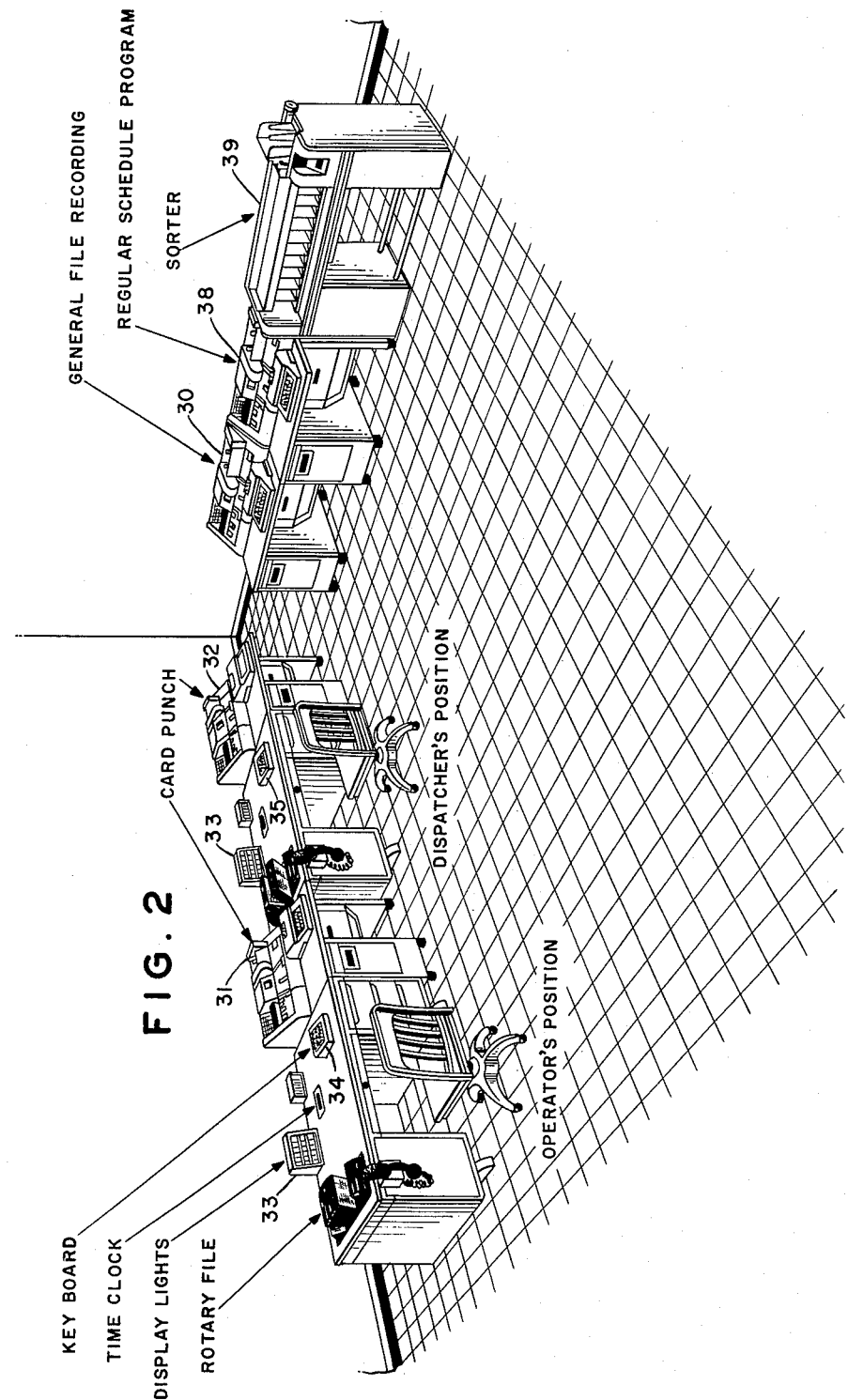
Fig. 2 is a pictorial illustration of a typical central station operating room in a system in accordance with the invention.

Information requiring action by the dispatcher or operator is supplied to the cards punched and printed by the devices 31 or 32 and/or is visually displayed on an illuminated board 33 in front of the respective positions, as is shown in Fig. 2 which is a pictorial illustration of a typical central station in accordance with the invention. If desired, all incoming information may be visually displayed to the operator and/or dispatcher to permit manual operation of the system.

The operator's position and the dispatcher's position also contain key boards 34 and 35, respectively, for supplying operational signals to the channel 24 by way of a buffer storage unit 36 and a transmitter 37, which may be of the same type as the transmitter 23.

On the right side of the room is Fig. 2 there is shown, in addition to the general file recording device 30, a regular schedule program device 38, which may also be an IBM machine, and a card sorter 39, for example, an IBM No. 082 sorter, which is a machine of the type described in United States Patent No. 1,969,362 to Ford. The device 38 is intended to put electrical signals on the line in accordance with prepunched cards. Suitable machines are illustrated in United States Patents Nos. 2,340,800 to Doty and 2,340,801 to Doty et al. These machines produce a punched tape of the type used in the transmission of telegraph signals. The code combinations provided in such a tape may easily be used selectively to energize the tone generators or other signalling devices described hereinafter. The device 38 is used for programming regularly scheduled operations. For example, prepunched cards, containing the burglar alarm opening and, closing and watchman reporting schedules, are sorted in the sorter 39 at the beginning of each day and are placed in the device 38. The device 38 then progressively reads this information from the cards, under the control of the clock 29, and supplies corresponding electrical signals to the channel 24 through the buffer storage device 36 and the transmitter 37. The operator's and dispatcher's key boards 34 and 35 should be designed so that all signals to be transmitted by the device 38 can be manually transmitted by the operator or dispatcher.

Signal information delivered to the channel 24 by the transmitter 37 is received by a receiver 40, which may be of the same type as the receiver 26, and is supplied, through a buffer storage device 41 to a selector 42 which supplies the signal information to the appropriate line terminal device. In general, there will be associated with the selector, equipment responsive to signals transmitted from the central station to apply the appropriate operating potentials to the line terminal unit.

*Subscriber's subset*

Figure 3:
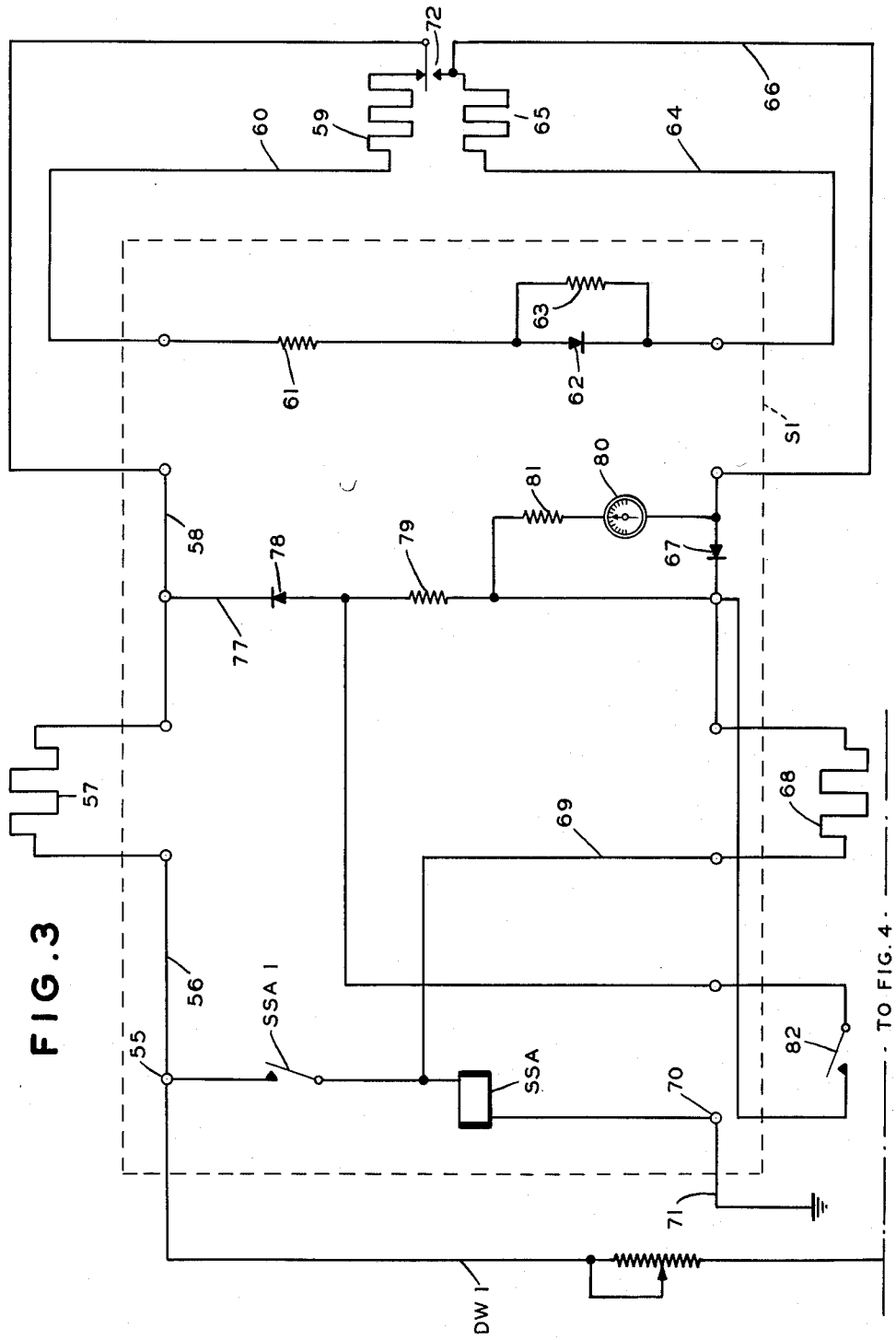
Fig. 3 is a circuit diagram of one form of subscriber's subset for use in the system of Fig. 1.

The subscriber's subset is located at the subscriber's premises and, among other things, serves as a termination for the central station connections and the local protection loops in the subscriber's premises. One such subset, designated S1, is shown in Fig. 3 by the dotted line. A direct connection from the subset to the substation is afforded by conductor DW1 and a common ground. The conductor DW1 is supplied with direct current of either positive or negative polarity from terminals 50 or 51 (Fig. 4), which may be, for example, 24 volt batteries. The circuit from terminal 50 extends through a conductor 52, make contacts LTB1 of a relay LTB, winding 53 of a polar relay LTA and conductor WD1. The circuit from terminal 51 extends through a conductor 54, make contacts LTC1 of a relay LTC, break contacts LTB2 of relay LTB, winding 53 and conductor DW1. Relay LTA is a balanced relay whose armature will remain in a neutral position when equal currents flow through windings 53 and 53'.

Conductor DW1 is connected to a terminal 55 in subscriber's subset S1. When the premises are closed, i.e., when all the protective devices are in the protection circuit, positive voltage is supplied to the terminal 55 over line DW1. The full or night protection circuit extends from terminal 55 through a conductor 56, day protection circuit 57, a conductor 58, night protection circuit 59, a conductor 60, a resistor 61, a rectifier 62 (having a resistor 63 connected in parallel therewith), a conductor 64, night protection circuit 65, a conductor 66, a rectifier 67, a day protection circuit 68, a conductor 69, the coil of a relay SSA, a terminal 70, and a conductor 71 to ground. In this full protection circuit, the day protection portions 57 and 68 are formed by elements which are always connected in service, for example, metallic foil on glass, while the night protection portions 59 and 65 are formed by elements only in service with the premises closed, for example, floor traps and door contacts. With 24 volts on the line, the resistor 61 might be, for example, 2,500 ohms, while the resistor 63 might be 30,000 ohms. The rectifiers 62 and 67 might be, for example, type IN34 diodes poled so as to permit the flow of current in the path described.

The relay SSA is adjusted so that, with normal voltage on the line DW1, relay SSA will remain deenergized. In the event that the protection circuit is opened, as by a burglar breaking a window foil or opening a protected door, the full protection circuit will be opened and the current will cease to flow through line DW1, resulting in the operation of polar relay LTA (Fig. 4) and the closing of contacts LTA1 thereof, which transmits an alarm in a manner to be described hereinafter. When a normally open contact in the protection circuit is closed, for example, when a protected door is opened, the resistor 61 is shunted and the current flow increases. Such a normally open contact is illustrated at 72 and it will be observed that closing of contacts 72 will connect conductor 58 directly to conductor 66. With a normal door contact device, this shunting action will, of course, occur after the normally closed door contacts have opened. Closing of the contacts 72 increases the current flow through coil SSA, causing the relay SSA to become energized. Once the relay SSA is energized, it locks up through normally open contacts SSA1 and will remain energized until voltage is removed from line DW1. The increase in current through line DW1, which occurs when contacts 72 are closed and which is maintained when relay SSA picks up, causes polar relay LTA to close contacts LTA2 thereof. As shown in Fig. 4, contacts LTA1 and LTA2 are connected in parallel, but this need not be the case since, under some circumstances it may be desirable to transmit to the central station separate signals for opens and grounds. However, as illustrated, closing of either contacts LTA1 or LTA2 will result in ground potential being applied to a conductor 73 through a circuit extending from a ground terminal 74, a conductor 75, a conductor 76 and either contacts LTA1 or LTA2.

For day protection, negative voltage is supplied to terminal 55 through conductor DW1. The resulting day current flows through a circuit extending from terminal 55 through conductor 56, day protection circuit 57, a conductor 77, a rectifier 78, a resistor 79, day protection circuit 68, conductor 69, the coil of relay SSA, terminal 70 and conductor 71 to ground. Opening of this circuit will result in the transmission of an alarm by operating the polar relay LTA.

When the subscriber desires to close his premises, he first connects all of the removable devices in the night protection circuit and makes sure that all protected doors, windows, safes, etc. are properly closed. He then observes the current flow shown on a milliammeter 80. One terminal of the meter 80 is coupled to the low side of resistor 79 through a resistor 81, while the other side thereof is connected to conductor 66. The meter 80 will thus read the small current flowing in the full protection circuit by virtue of the resistor 63 which shunts the rectifier 62. For a resistor 79 of 2500 ohms and a resistor 81 of 15,000 ohms, the normal current with a line voltage of 24 volts might be about 0.27 ma. A ground existing, as by contacts 72 being closed, could produce a current of about 0.77 ma. An open will result in zero current flow through the meter 80. If the current reading is improper, the subscriber should check the protection devices, doors, windows, etc. to find the trouble.

If the meter reading is correct, the subscriber proceeds to his exit door and opens the same. He then momentarily operate a delayed closing push button switch 82 located inside the premises but adjacent to the door through which he is about to leave. He then leaves the premises and closes the door behind him. The time delay on the closing of switch 82 is sufficient so that the door will be closed and the night protection circuit complete before the switch 82 closes. Closing of the switch 82 shunts the resistor 79 and increases the current flow sufficiently to operate the relay SSA, which in turn operates the polar relay LTA. Switch 82 is only closed momentarily. If the closing of the protected premises occurs during a preset time interval, the line terminal unit will be conditioned to respond to the operation of relay LTA to put positive voltage on line DW1 and set the system in closed operation with full protection. The changeover from negative to positive voltage on line DW1 will result also in release of relay SSA, since momentarily there will be zero voltage on line DW1.

At a later preset time the line terminal unit will be conditioned so as to be in a preopening condition. It will then respond to the opening of the door and the consequent operation of relay LTA to put negative voltage on the line and set the system for day protection. Opening of the door prior to this preset time will result in transmission of an alarm in the usual way.

During the night protection period it is desirable that the integrity of the system be tested periodically. To effect this test, the line terminal unit may be conditioned to apply a higher than usual voltage to the line DW1, e.g., 45 volts. The resulting current flow through the protection circuit will operate relay SSA if the system is in working order. Momentary removal of voltage from the line will cause relay SSA to drop out, returning the system to normal.

Line terminal unit

The line terminal unit (Fig. 4) comprises, in addition to relays LTA, LTB and LTC previously identified, relays LTD and LTE. In the upper right-hand corner of Fig. 4 there is a series of input conductors labeled Test, B Operate, C Operate and D Operate, respectively, which are connected to correspondingly labeled terminals on Fig. 8 and which may be a row of stationary contacts on a telephone-type rotary selector switch. In the lower right-hand corner of Fig 4 there is a series of input and output conductors labeled Lamp B Operate, C Operate, E Operate, B Read, C Read, D Read, Stop and Start, respectively, which are connected to correspondingly labeled terminals on Fig. 5 and which may similarly be a row of stationary contacts on a telephone-type rotary selector switch. It will be understood that a separate line terminal unit will be provided for each subset and that a separate row of stationary contacts will be provided in Figs. 5 and 8 for each line terminal unit.

In addition to the contacts LTB1 and LTB2, relay LTB is also provided with make contacts LTB3 and break contacts LTB4. In addition to contacts LTC1, relay LTC is provided with break contacts LTC2, make contacts LTC3, and break contacts LTC4. The relay LTD is provided with break contacts LTD1, make contacts LTD2, and break contacts LTD3. The relay LTE is provided with break contacts LTE1, make contacts LTE2 and make contacts LTE3. By "make" contacts is meant contacts which close upon energization of the relay, and by "break" contacts is meant contacts which open upon energization of the relay. In certain other portions of this description, especially in connection with the translator of Fig. 6, the terms "make" and "break" are replace by the equivalent terms "normally open" and "normally closed" respectively.

The line terminal unit serves the same function as the galvanometer movement of a typical manual burglar alarm drop. It also performs the functions of the Day-Night switch customarily placed in subscriber's control sets, and the local and line switches on the burglar alarm drop. The line terminal unit also acts as a memory device for storing impulses received from the programming unit in the central station so that openings may be distinguished from alarms, and as a storage device for signals received over the line from the subscriber's premises until this information is transmitted to the central station.

In the system being described, there are four steady state conditions of the line terminal unit, namely, Day, Night, Preopen and Disconnect. The relay positions for these conditions are shown in the following chart with the legend "1" representing a relay energized and the legend "0" representing a relay deenergized.

| Condition | Relay LTA | Relay LTB | Relay LTC | Relay LTD | Relay LTE |
| --- | --- | --- | --- | --- | --- |
| Day | 0 | 0 | 1 | 0 | 0 |
| Night | 0 | 1 | 0 | 0 | 0 |
| Preopen | 0 | 1 | 1 | 0 | 0 |
| Disconnect | 0 | 0 | 0 | 0 | 0 |

Relay LTA is a neutral polar relay whose contacts are normally open. This is the line relay and is intended to detect increases or decreases in line current. With contacts LTA1 and LTA2 connected in parallel, as shown, the system recognizes either a decrease or an increase in line current as a single form of abnormality. The coil of relay LTD is connected between conductor 87 and conductor 73 to the armature of relay LTA so that relay LTD follows directly the energization or deenergization of relay LTA.

One side of the coils of each of relays LTB and LTE is connected to −24 volt terminal 51 through conductors 83 and 84, respectively, and conductors 85 and 54. One side of the coils of each of relays LTC and LTD is connected to +24 volt terminal 50 through conductors 86 and 87, respectively, and conductors 88 and 52. The other side of the coil of relay LTB is connected to the B Operate terminals through a conductor 89. The other side of the coil of relay LTC is connected to the C Operate terminals through a conductor 90. The other side of the coil of relay LTD is arranged to be connected to ground terminal 74 when the armature of relay LTA operates. The other side of the coil of relay LTE is arranged to be connected either to the E Operate terminal through contacts LTD3 and a conductor 91, or to ground terminal 74 through contacts LTD2 and conductor 75. When energized, relay LTB locks up through a circuit including contacts LTB3, a resistor 92, and conductors 76 to ground terminal 74. When energized, relay LTC locks up through a circuit including contacts LTC3, a resistor 93 and conductor 76 to ground terminal 74. When energized, relay LTE locks up through a circuit including contacts LTE3, a resistor 94 and conductor 76 to ground terminal 74.

The D Operate terminal is adapted selectively to be connected, through the corresponding selector wiper contact, to a source of test voltage, e.g. −45 volts D.C. This voltage, when it appears on the D Operate terminal, is supplied to the coil 53 of relay LTA to maintain the latter in its unbalanced condition through a circuit including a conductor 95, contacts LTC2 and contacts LTB2. The TEST terminal is connected to line DW1 through a conductor 96. The B Read terminal is arranged to be connected to ground terminal 74 through a circuit including a conductor 97, contacts LTB4, a conductor 98 and conductor 75, so that ground potential will appear on the B Read terminal when relay LTB is deenergized.

The C Read terminal is arranged to be connected to ground terminal 74 through a circuit including a conductor 99, contacts LTC4, conductor 98 and conductor 75, so that ground potential will appear on the C Read terminal when the relay LTC is deenergized. The D Read terminal is arranged to be connected to ground terminal 74 through a circuit including a conductor 100, contacts LTD1, and conductor 75, so that ground potential will be applied to the D Read terminal when relay LTD is deenergized.

The Stop terminal is arranged to be connected to ground terminal 74 through a conductor 101, contacts LTE1 and conductor 75 so that ground potential will appear on the Stop terminal when relay LTE is in its deenergized condition. The Start terminal, which is common to the corresponding terminals of all of the line terminal units associated with the translator of Fig. 5, is arranged to be connected to ground terminal 74 through a conductor 102, contacts LTE2 and conductor 75 so that ground potential will appear on the Start terminal when relay LTE is energized.

Line finder

The line finder, Fig. 5, is a unit which is put into action upon the occurrence of a condition in an associated line terminal unit. The line finder finds the output terminals of the proper line terminal and transfers the signal information found on these terminals to the translator, Fig. 6. The line finder may be constructed in the form of a telephone-type rotary selector switch having a series of banks of stationary contacts and a corresponding set of wiper arms arranged to make successively with the corresponding contacts of succeeding poistions of stationary contacts. Thus in Fig. 5 the output terminals of the line terminal unit of Fig. 4 constitute a set of positions in each of the banks of stationary contacts. Additional positions (not shown) are provided for the additional line terminal units. In addition, there is provided a position of home contacts, these being the contacts upon which the wiper arms are resting in Fig. 5. It will be observed that the line terminal units all share a single Start contact which is located in the home position. The home position does not have a Stop contact. There is a single wiper arm which contacts the Start contact in the home position and the Stop contacts in the various line terminal unit positions.

The Start-Stop wiper is connected through a conductor 103 to one end of stepping coil 104 and to one end of a relay LFR. The other end of coil 104 is connected to an input terminal marked Release, through interrupter contacts 104'. The coil 104 is a stepping switch-type coil which is provided with an armature arranged, each time the coil 104 is released, to advance the line finder wiper arms to the succeeding position of stationary contacts. Each time the coil 104 is energized, its interrupter contacts 104' open to release the coil 104 and advance the wiper arms one step. The Release terminal is connected to a source of +24 volts D.C. at a terminal 105 (Fig. 6) through a conductor 106, a terminal R, normally closed contacts $Z_4$ of a relay Z (Fig. 6), and a conductor 107.

The other side of the coil of relay LFR is connected to +24 volt terminal 108. Relay LFR is provided with normally closed contacts LFR1. Normally open contacts 104'' are arranged to be closed when the wiper arms are off the home contact position. The contacts LFR1 and 104'' are connected in series between a terminal LFS and a ground terminal 109. The terminal LFS is connected to a terminal S (Fig. 6) through a conductor 110.

The wiper arms of Fig. 5 are connected to terminals in Fig. 6 through conductors as follows:

| Wiper Arm | Terminal | Conductor |
|---|---|---|
| B Operate | BO | 111 |
| C Operate | CO | 112 |
| E Operate | EO | 113 |
| B Read | BR | 114 |
| C Read | CR | 115 |
| D Read | DR | 116 |

When the LTE relay of a line terminal unit operates, ground is removed from its Stop terminal and applied to the common Start terminal. Application of ground to the Start terminal completes the energizing circuit for stepping coil 104. The contacts 104' then open, releasing the coil 104 and advancing the wiper arms by one step, i.e., to a position in which the wiper arms are in contact with the corresponding output terminals of the first line terminal unit. The Start-Stop wiper arm rests on the Stop terminal. If the corresponding relay LTE is deenergized, ground potential exists on this Stop terminal, resulting in the wiper arms being advanced another step. This procedure is repeated until the Start-Stop wiper contacts a Stop terminal whose associated LTE relay is energized. Because of the resulting open condition of contacts LTE1, the coil 104 will not be energized, and the wiper arms will remain in contact with the line terminal unit output terminals until the operated LTE relay becomes deenergized, in a manner to be described hereinafter. Release of the energized relay LTE will apply ground potential to its Stop contact, allowing the sequence of operations of the 104 coil to continue until the Start-Stop wiper reaches its home Start contact or until it contacts another Stop contact associated with an operated LTE relay.

Translator

The translator (Fig. 6) is intended to check the condition of a line terminal unit, make a decision as to the type of occurrence which has taken place, and present this decision in a form which can be read out into a buffer storage device. The translator thereupon resets the line terminal unit to the next logical state and, before releasing itself, checks to see that all of the operations have been performed properly.

The translator comprises a number of relays designated, from left to right in Fig. 6, Z, P, W, X, Y, L, M, A, C, O, T and Q. Each of these relays is provided with contacts designated with the same letter and an individual subscript numeral, e.g., the normally closed contacts $P_1$ in series with the Z relay coil. Where a single armature serves both a normally closed and a normally open translator relay contact, they will be designated by the normal condition, e.g., the normally closed or normally open contacts $L_4$. The translator is provided with a +24 volt D.C. terminal 105, a —24 volt D.C. terminal 117 and a ground terminal 118.

The translator is connected to the central station through a communication channel, as described in connection with Fig. 1. The various translator output terminals at which a signal may appear for transmission to the central station are shown at the right side of Fig. 6 and are designated L, M, A, C, O and T. Buffer storage will preferably be interposed between the translator and the communication channel, but for simplicity is omitted in this discussion. A transmitting device for supplying the translator output to the channel and a receiving device for supplying this output to the central station equipment will, of course, be needed. This equipment may take any suitable form. One suitable form, involving the use of tone generators and tuned relays, will be described hereinafter. Another signal which will be required is a line identifying signal so that the translator output supplied to the card punch device 30 and, where appropriate, the device 31 or 32 (Fig. 1), will be definitely associated with a particular subscriber's premises. Any suitable line identifying system may be used, and one such suitable system will be described hereinafter.

The line finder and translator are intended to supply appropriate signal information to the central station from the line terminal units. In order to transmit information in the reverse direction, i.e., from the central station to the line terminal unit, there are provided at the central station a regular schedule program device 38, an operator's keyboard 34 and a dispatcher's keyboard 35. In so far as the line terminal units are concerned, all such information could be derived from a single switching system which could be any one of the units 38, 34 or 35. Thus, for simplicity, only a single such unit is shown in detail, this being the keyboard unit of Fig. 7. The signal output of the keyboard of Fig. 7 may be transmitted to the substation over the communication channel, preferably with the use of buffer storage, and with the use of transmitting and receiving devices of the same type as will be described hereinafter in connection with the translator output. The keyboard output is supplied to the appropriate line terminal unit through a selector mechanism shown in Fig. 8 and which is similar to the line finder of Fig. 5.

Central station keyboard

The central station keyboard, Fig. 7, comprises a number of multi-contact manual switches KDN, KTN, KL, KC, KB, KML and KO. All of these switches are of the non-locking type which return to their neutral conditions when released, except KDN, KTN and KO, which will stay in their up, down or neutral positions until moved therefrom. Movement of the switch handles upward or downward will operate the switch contacts shown above or below the switch handles, respectively. With the switches in their neutral positions, the contacts will be in the conditions shown. The key board unit of Fig. 7 provides direct switching control of the various signalling functions to be performed and hence requires a number of wire connections to the selector of Fig. 8. Thus the key board of Fig. 7 would most desirably be located at the substation 25 for local or emergency operation. The Fig. 7 circuit is shown in the Fig. 9 assembly for simplicity. However, for central station operation over the channel 24 the functions performed by the Fig. 7 circuit will preferably be effected by an arrangement of the type shown in Figs. 12, 13 and 14.

The switch KDN has normally open contacts KDN1, KDN2, KDN3 and KDN4. The switch KTN has normally open contacts KTN1 and KTN2. The switch KL has normally closed contacts KL1 and KL3 and normally open contacts KL2, KL4 and KL5. The switch KC has normally open contacts KC1 and KC2. The switch KB has normally open contacts KB1 and KB2. The switch KML has normally open contacts KML1 and KML2. The switch KO has normally closed contacts KO1 and KO3 and normally open contacts KO2.

At the right side of Fig. 7 are shown a −24 volt D.C. terminal 119, a +24 volt D.C. terminal 120, a ground terminal 121 and three test battery terminals 122, 123 and 124 connected to a test battery 125 poled as shown. At the left side of Fig. 7 are shown output terminals designated Test, B operate, C operate, D operate, Reset and Dial. These output terminals are connected to corresponding terminals on Fig. 8, as indicated by the dotted lines 126, 127, 128, 129 130 and 131.

The central station keyboard is also provided with a relay KK having normally open contacts KK1. A dial mechanism 132 having interrupter contacts 132' is connected between ground terminal 121 and the dial terminal. The dial mechanism 132 operates in the manner of a telephone dial to interrupt a circuit a desired number of times thereby to put on the line a number of signals corresponding to the number of the line terminal unit to be contacted. Such a simple arrangement would, of course, be applicable only to a limited number of line terminal units, so that a practical system which might have many hundreds of line terminal units would require a more complicated dialing system such as is employed in automatic telephone exchanges. For example, such a system might employ a number of dialing digits.

Selector

The selector, Fig. 8, is constructed in a manner similar to the line finder of Fig. 5 and has a position of four stationary home contacts and a corresponding position of stationary contacts for each line terminal unit. The wiper arms are designated Test, B Operate, C Operate and D Operate and are connected to the corresponding selector input terminals through conductors 133, 134, 135 and 136, respectively.

The wiper arms are caused to advance from position to position of stationary contacts each time a selector stepping winding coil 137 is deenergized. The selector coil 137 is included in a circuit extending from +24 volt D.C. terminal 138 through a conductor 139, coil 137, normally closed contacts SR1 of a relay SR and a conductor 140 to a ground terminal 141. The coil of relay SR is connected between conductor 139 and the Dial terminal so that, each time ground potential is removed from the Dial terminal, relay SR will be deenergized. As shown, ground is applied to the Dial terminal of Fig. 8 directly from ground terminal 121 of Fig. 7.

Each time relay SR is deenergized, coil 137 is energized. When relay SR picks up, coil 137 becomes deenergized and the wiper arms advance by one position of stationary contacts. In this way the wiper arms will advance to contact a set of stationary contacts corresponding to the line terminal unit whose number has been dialed by the operator in the central station (or whose number has been selected and transmitted by the regular schedule program device 38 (Fig. 1)).

With the selector in contact with the proper line terminal unit, the signal appearing on the Test, B Operate, C Operate or D Operate terminal, as the case may be, is transmitted through the associated wiper arm to the corresponding terminal of the line terminal unit to initiate appropriate action.

When the operator is ready to release the line terminal unit, or when a time has passed as predetermined by the operator when using buffer storage, ground potential is applied to the Reset terminal of Fig. 8. As shown, the circuit for this extends from ground terminal 121 (Fig. 7) through a conductor 142, a conductor 143, contacts KO1, a conductor 144, and conductor 130. Ground potential on the Reset terminal of Fig. 8 completes an energizing circuit for selector coil 137 extending from +24 volt D.C. terminal 138 through conductor 139, coil 137, selector interrupter contacts 137', selector off normal contacts 137" and a conductor 130' to the Reset terminal. The contacts 137" will be closed since the wiper arms are off the home contacts. Energization of coil 137 will open contacts 137', allowing coil 137 to release thus advancing the wiper arms. However, release of coil 137 will close contacts 137', again energizing coil 137. Thus the wiper arms will be advanced until they reach their home contacts, at which time contacts 137" will open to prevent further energization of coil 137.

Alarm

Assuming that the protection system for a particular subscriber's premises is set for night, i.e., maximum protection, relays LTA, LTC, LTD and LTE of the associated line terminal unit will all be deenergized and relay LTB will be energized. If a cross, break or ground occurs in a protection device, relay LTA operates causing relay LTD to operate which in turn causes relay LTE to operate and lock in through its LTE3 contacts. Since the Start terminal is common to all line terminal units, when any LTE relay operates a ground is placed on the Start terminal to initiate the movement of the line finder wiper arms. The Stop terminals are individual for each line terminal unit and are grounded by the closed LTE1 contact on all line terminal units except the one which has a signal to transmit. The line finder wiper arms stop when the Start-Stop wiper arm contacts an ungrounded Stop terminal. The other six wiper arms of the line finder then provide connections between the selected line terminal unit and the translator.

The conditions of the five relays in the line terminal unit, when an alarm condition exists, are as follows: LTA, LTB, LTD and LTE energized and LTC deenergized. In the translator, relay W reads the condition of the LTD relay, relay X reads the condition of the LTC relay and relay Y reads the condition of the LTB relay. Since relay LTD is energized, the D Read contact LTD1 is open and relay W, which is connected between +24 volt D.C. conductor 107 and the D Read terminal, will be deenergized. Since relay LTC is deenergized, relay X, which is connected between conductor 107 and the C Read terminal, will be energized; ground appears on the C Read terminal through break contacts LTC4.

Since relay LTB is energized, relay Y, which is connected between conductor 107 and the B Read terminal, will be deenergized, the B Read circuit being open at break contacts LTB4.

When the line finder wiper arms stop at a line terminal unit, the S terminal of the translator is grounded through a circuit extending from S terminal through conductor 110, terminal LFS, contacts LFR1, contacts 104″ and terminal 109. This ground is not applied until an ungrounded Stop terminal of a line terminal unit is found, since at such time relay LFR releases closing contacts LFR1 and applying the ground.

Application of ground potential to terminal S energizes relay P which is connected between conductor 107 and terminal S through normally closed contacts $Q_2$. Relay P is of the slow-to-operate type to afford time for the W, X and Y relays to read the condition of the LTD, LTC and LTB relays, respectively, prior to transfer of the $P_2$ contacts.

Transfer of the $P_2$ contacts applies ground to the alarm output terminal A through a circuit extending from terminal S through normally open contacts $P_2$, normally closed contacts $Q_3$, normally closed contacts $W_2$, normally open contacts $X_2$, normally closed contacts $Y_2$ and a conductor 145. The translator A relay, which is connected between conductors 107 and 145, also picks up and locks in through its normally open contacts $A_4$ which are connected to terminal S through a conductor 146.

Operation of relay A closes normally open contacts $A_1$ which puts ground potential on the terminal CO (and thus also on the C Operate terminal because of the connection through conductor 112) through a circuit extending from ground terminal 118 through a conductor 147, a conductor 148, normally open contacts $A_1$, normally closed contacts $L_1$, normally closed contacts $T_1$, and normally closed contacts $Z_1$ to terminal CO. The LTC relay is thus caused to operate and lock in through its normally open contacts LTC3.

Operation of relay A closes normally open contacts $A_2$, applying −24 volts to the BO terminal and thus to the B Operate terminal (via conductor 111). The circuit extends from −24 volt D.C. terminal 117 through a conductor 149, normally open contacts $A_2$, normally closed contacts $L_2$, normally closed contacts $T_2$, and normally closed contacts $Z_2$ to terminal BO, and, through conductor 111, to the B Operate terminal. This causes the LTB relay to become deenergized since the −24 volts bucks the −24 volts applied to the other side of the LTB relay through conductor 83.

Dropping out of relay LTB opens contacts LTB1 and closes contacts LTB2, reversing the polarity of the voltage applied to line DW1 through the coil 53 of relay LTA. This reversal from plus battery to minus battery allows relay SSA to drop out (if previously energized by an increase of current in the protection loop). Dropping out of relay SSA allows relay LTA to deenergize, which allows relay LTD to deenergize.

Closing of normally open contacts $A_3$ energizes the Q relay through a circuit extending from conductor 107 through the coil of relay Q, contacts $A_3$ and conductor 147 to ground terminal 118.

The relays in the line terminal unit are now as follows: LTC and LTE energized, and LTA, LTB and LTD deenergized. The relays in the translator are now as follows: W is energized, X is deenergized, Y is energized. The A relay has locked in through contacts $A_4$ and so is energized despite the opening of contacts $Y_2$. Q relay is energized because of the closing of contacts $A_3$. The P relay is deenergized because of the opening of normally closed contacts $Q_2$.

The sequence of events which has taken place is as follows: the alarm signal has been interpreted and has been transmitted to the central station (by application of ground potential to the A terminal) and the line terminal unit has been reset to the next logical condition, namely, day protection (with LTA, LTB and LTD deenergized, LTC and LTE energized, and negative battery on line DW1). The translator is now ready to be released, which will occur when a reset contact $RC_1$ is closed. The contacts $RC_1$ are operated by a relay RC which is connected between ground conductor 147 and a source of a reset signal. The source of reset signal may be any convenient point in the system subsequent to the translator. For example, actuation of any of the transmitting tone generators (which means a signal has been picked off from the translator output terminals) may be used as a trigger to apply operating potential to the relay RC. Another possibility is pick up of a translator output signal by the buffer storage device. If desired, receipt of a translator output signal by the central station may be used to send a return signal, e.g., a special tone, which will actuate the RC relay. In such case the RC relay might be tuned to respond only to such special tone.

Closing of contacts $RC_1$, as described, causes relay Z to become energized through a circuit extending from +24 volts D.C. terminal 105 through conductor 107, the coil of relay Z, normally closed contacts $P_1$, normally open contacts $W_1$, normally open contacts $Q_1$, normally open contacts $RC_1$ and conductor 147 to ground terminal 118. Energization of relay Z causes normally closed contacts $Z_1$ thereof to open removing ground from the CO and C Operate terminals. Relay LTC remains energized, however, through its own make contact LTC3. Normally closed contacts $Z_2$ open and remove −24 volts from the BO and B Operate terminals so that relay LTB will remain deenergized. Normally open contacts $Z_3$ close putting −24 volts on the EO and E Operate terminals, thus causing relay LTE to become deenergized. Dropping out of relay LTE grounds the Stop terminal of the line finder unit by closing of break contacts LTE1. This in turn will cause relay LFR to become energized, opening contacts LFR1.

Opening of contacts LFR1 removes ground from the S terminal of the translator which allows the A relay to deenergize, removing ground from the A terminal. It will be recalled that ground on the A terminal caused the transmission of an alarm signal to the central station. Opening of normally open contacts $A_3$ drops out the Q relay. The normally closed contacts $Z_4$ being open, prevent the line finder wiper arms from stepping to their home positions until the Q relay drops out opening normally open contacts $Q_1$ and dropping out relay Z. Application of +24 volts to the line finder Release terminal through normally closed contacts $Z_4$ results in energization of coil 104. The line finder wiper arms will step around until its Start-Stop arm either encounters an ungrounded Stop terminal of a line terminal unit or the home start terminal which is ungrounded when there is no line terminal circuit with a signal to transmit.

*Momentary*

If a momentary break or ground occurs during the night condition, relay LTA energizes. Energization of relay LTA will cause relay LTD to become energized, which in turn causes relay LTE to become energized and lock in through contacts LTE3. Relays LTA and LTD drop out at the end of the momentary, giving a line terminal unit relay condition as follows:

LTA deenergized
LTB energized
LTC deenergized
LTD deenergized
LTE energized

Connection between the line terminal unit and the translator will be provided through the line finder unit as previously described.

In the translator, relay W is energized through normally closed contacts LTD1, relay X is enerergized through normally closed contacts LTC4, and relay Y is deenergized because of the open condition of normally closed contacts LTB4. The slow-to-operate P relay will become energized after a short time delay, the energizing circuit being completed upon the application of ground potential to terminal S. Ground potential, placed on terminal S through contacts LFR1 and 104", will be applied to output terminal M through a circuit extending from terminal S through normally open contacts $P_2$, normally closed contacts $Q_3$, normally open contacts $W_2$ and a conductor 150 to terminal M.

With ground potential on conductor 150, ground will be applied to one side of the coil of relay M energizing the latter. Relay M locks in through its normally open contacts $M_2$ and normally closed contacts $L_4$. Normally open contacts $M_1$ close and energize the Q relay. Normally closed contacts $Q_2$ then open causing the P relay to deenergize. Dropping out of relay P will not remove ground from the M terminal because of the circuit through normally open contacts $M_2$. The conditions of the relays LTB and LTC are left unchanged.

The translator, having completed its function of applying ground potential to the momentary output terminal M, is ready to be reset by application of the RESET signal to relay RC. The resulting operation of relay RC. closes normally open contacts $RC_1$, in turn energizing the Z relay. Opening of normally closed contacts $Z_4$ removes $+24$ volts from the line finder selector coil 104 so that the selector switch cannot step. Normally open contacts $Z_3$ close putting $-24$ volts on the EO and E Operate terminals from terminal 117; this causes relay LTE to be deenergized since the $-24$ volts applied to the top end of the coil of relay LTE from the E Operate terminal through normally closed contacts LTD3 bucks the $-24$ volts applied to the other end of the coil of relay LTE from terminal 51.

Closing the back contacts LTE1 grounds the Stop terminal of the line finder, causing relay LFR to become energized, opening contacts LFR1 and thus removing ground from the translator S terminal. Removal of ground from the S terminal causes relay M to drop out and removes ground potential from the momentary output terminal M. Removal of ground potential from terminal M takes the momentary signal off the line. Opening of normally open contacts $M_1$ drops out relay Q, and the resulting opening of normally open contacts $Q_1$ allows the relay Z to drop out. Closing of normally closed contacts $Z_4$ applies $+24$ volts to the line finder Release terminal causing the line finder selector switch to step itself to the home position or to another signalling line terminal unit, as previously described.

It will be recalled that in the normal night condition, relay LTB is energized and relays LTA, LTC, LTD and LTE are deenergized. The dropping out of relay LTE upon the closing of normally open contacts $Z_3$ thus returns the line terminal unit to the next logical condition, namely, the normal night condition. It will be observed that the next logical condition after an alarm is the day condition, but after a momentary (during the night) it is the night condition.

*Closing*

During the day condition the line terminal unit relays are in conditions as follows:

LTA deenergized
LTB deenergized
LTC energized
LTD deenergized
LTE deenergized

When a subscriber is ready to leave his premises he checks to see that he has closed all protected openings by observing the reading on his control set meter 80. He then operates the time delay closing switch 82 and leaves the premises. After the subscriber has closed and locked his exit door, the time delay switch 82 momentarily closes, shunting out the resistor 79 in the day circuit which causes relay SSA to energize and lock in as described previously. Energizing of relay SSA causes relays LTA, LTD and LTE to become energized and the subscriber's line terminal unit to be connected to the translator through the line finder as previously described.

The W, X and Y relays are deenergized, deenergized and energized, respectively, because of the corresponding conditions of relays LTD, LTC and LTB, respectively. Thus with relay LTD energized, contacts LTD1 will be open, keeping ground potential off the D Read and DR terminals. With relay LTC energized, contacts LTC4 will be open, keeping ground potential off the C Read and CR terminals. With relay LTB deenergized, contacts LTB4 will be closed, applying ground potential to the B Read and BR terminals; hence relay Y will be energized. Slow-to-operate relay P will pick up after a time delay, the energizing circuit extending from $+24$ volt terminal 105 through conductor 107, normally closed contacts $Q_2$, the coil of relay P, terminal S, conductor 110, contacts LFR1, contacts 104" and terminal 109 to ground.

Ground potential appearing on terminal S will be applied to the translator "closing" output terminal C through normally open contacts $P_2$, normally closed contacts $Q_3$, normally closed contacts $W_2$, normally closed contacts $X_2$, normally open contacts $Y_3$ and a conductor 151. Application of ground potential to terminal C results in transmission of a closing signal to the central station where the time of closing is compared with the scheduled closing time. This comparison may be done by an operator or by automatic accounting machinery of the type heretofore mentioned. For example, an accounting card may be punched with the subscriber's identification, the fact of closing and the time of closing. This may be compared either by the operator or by the machinery with the scheduled time for this subscriber. If the closing time is within preset limits, the fact of closing will be recorded. If the time is not within the preset limits, appropriate investigation will be initiated. In some systems, proper closing and opening are ascertained by a coded signal from the subscriber's premises rather than by the time of occurrence. Such an operation can easily be accommodated in the system of the invention by providing a coded signal sensing circuit either in the line terminal unit or at the central station.

Application of ground potential to the conductor 151 also energizes the C relay, which thereupon locks up through its normally open contacts $C_4$ and normally closed contacts $T_4$.

Closing of normally open contacts $C_1$ puts $+24$ volts from conductor 107 on the CO and C Operate terminals, resulting in deenergization of relay LTC by bucking out of the $+24$ volts applied to relay LTC from terminal 50. The circuit extends from conductor 107 through normally open contacts $C_1$, normally closed contacts $O_1$, normally closed contacts $A_1$, normally closed contacts $L_1$, normally closed contacts $T_1$, normally closed contacts $Z_1$, terminal CO, conductor 112, the C Operate wiper arm and contact of the line finder unit, the C Operate terminal of the line terminal unit, and conductor 90 to the top of the coil of relay LTC.

Closing of normally open contacts $C_2$ puts ground on the BO and B Operate terminals, causing the LTB relay to energize and lock up through contacts LTB3. The circuit extends from ground terminal 118 through conductor 147, normally open contacts $C_2$, normally closed contacts $O_2$, normally closed contacts $A_2$, normally closed contacts $L_2$, normally closed contacts $T_2$, normally closed contacts $Z_2$, terminal BO, conductor 111, the B Operate wiper arm and contact of the line finder selector switch, the B Operate terminal of the line terminal unit, and conductor 89 to the top of the coil of relay LTB.

Closing of normally open contacts $C_3$ causes relay Q to energize. The opening of normally closed contacts $Q_2$ opens the energizing circuit for relay P, allowing the latter to drop out.

When relay LTB becomes energized, +24 volts from terminal 50 is applied to line DW1 through make contacts LTB1, replacing the −24 volts previously applied to line DW1 through break contacts LTB2. This reversal of line current results in deenergization of the relay SSA. The relay LTA thereupon assumes its neutral position, allowing relay LTD to drop out. Deenergization of relay LTD closes contacts LTD1, applying ground potential to the DR terminal and energizing relay W.

With the exception of relay LTE, the relays of the line terminal unit are now all in their normal night conditions, i.e., all deenergized except for LTB, and the translator has completed its function and is ready to be released, provided of course that in being released it drops out relay LTE. Release of the translator is effected by applying a reset signal to relay RC. Operation of relay RC closes contacts $RC_1$ resulting in energization of relay Z as described previously. Opening of normally closed contacts $Z_4$ removes +24 volts from the line finder Release terminal.

Closing of normally open contacts $Z_3$ puts −24 volts on the EO and E Operate terminals, causing relay LTE to drop out. Closing of back contacts LTE1 puts ground potential on the Stop terminal of the line finder, causing relay LFR to become energized. The resulting opening of contacts LFR1 removes ground from the S terminal, allowing relay C to drop out and removing ground from the translator "closing" signal terminal C. When normally open contacts $C_3$ open, relay Q deenergizes, opening normally open contacts $Q_1$ and thereby allowing relay Z to deenergize. The closing of normally closed contacts $Z_4$ applies +24 volts to the selector winding 104, causing the line finder to step around either to home position or to another signalling line terminal unit, as previously described.

Trouble

When a subscriber closes his premises it sometimes happens that he closes in trouble, i.e., with a ground or cross on a protection device or interconnecting wiring. With such a condition at the subscriber's premises, his SSA relay will not remain deenergized when the current on line DW1 is reversed by transfer of the LTB relay contacts as described above. If the trouble condition is an open on the line or in the premises, the LTA relay remains energized although the SSA relay is deenergized. Thus for a trouble condition the line terminal unit relays will be in the following positions:

```
LTA   energized
LTB   energized
LTC   deenergized
LTD   energized
LTE   energized
```

Since relay LTE has been maintained energized by failure of relay SSA to deenergize, the line finder has not been released and the line terminal unit is still connected to the translator. Moreover, since relay LFR has not been energized, ground potential is still applied to the S terminal whereby relay C is still energized. Since relay C is energized, relay LTC is deenergized, and contacts LTC4 are closed, applying ground potential to relay X and energizing the latter. Relay Q is energized through normally open contacts $C_3$. Thus relays X, C and Q are energized; the remaining translator relays are deenergized.

Under these conditions, ground potential on the terminal S of the translator will be applied to "trouble" output terminal T through conductor 146, normally closed contacts $P_2$, normally closed contacts $W_3$, normally open contacts $Q_4$ and a conductor 152. Ground potential on terminal T results in the transmission of a trouble signal to the central station. Ground potential on conductor 152 results in energization of relay T which thereupon locks up through its normally open contacts $T_4$. Opening of normally closed contacts $T_4$ results in deenergization of relay C by opening the locking circuit of the latter.

Closing of normally open contacts $T_3$ maintains relay Q energized despite the opening of normally open contacts $C_3$. Opening of normally open contacts $C_1$ removes +24 volts from the terminal CO. Normally open contacts $C_2$ open, removing ground from the BO terminal. Closing of normally open contacts $T_1$ applies +24 volts to the CO terminal (and hence to the C Operate terminal) through normally closed contacts $Z_1$. Closing of normally open contacts $T_2$ applies −24 volts to the BO terminal (and hence to the B Operate terminal) through the normally closed contacts $Z_2$. Thus the LTC relay remains deenergized and the LTB relay becomes deenergized. With relays LTC and LTB deenergized, no power will be applied to the line DW1, allowing relays SSA, LTA and LTD to drop out. On the line terminal unit only relay LTE remains energized. In the translator, only relays W, X, Y, T and Q are energized.

The translator has now completed its function and is ready to be released. This is effected by applying the reset signal to relay RC. Closing of normally open contacts $RC_1$ causes relay Z to become energized. Opening of normally closed contacts $Z_4$ removes the +24 volts from terminal R and hence from the line finder Release terminal. Closing of normally open contacts $Z_3$ puts −24 volts on the EO terminal and hence on the E Operate terminal, thus deenergizing relay LTE.

Since all of the line terminal relays are now deenergized, the line terminal unit is now in its disconnect condition and will remain so until the trouble at the subscriber's premises has been cleared up.

Closing of contacts LTE1 applies ground potential to the Stop terminal, causing relay LFR to become energized. Contacts LFR1 open, removing ground from the translator S terminal, allowing relay T to become deenergized and removing ground from the T output terminal. Dropping out of relay T opens normally open contacts $T_3$, dropping out relay Q. Opening of normally open contacts $Q_1$ allows relay Z to drop out and the resultant closing of normally closed contacts $Z_4$ applies +24 volts to winding 104 causing the line finder selector switch to step around to home position or to another signalling line terminal unit, as previously described.

In order to clear up the trouble it is customary to dispatch a maintenance man to the subcriber's premises. After the trouble has been cleared up, the maintenance man contacts the central station and advises the operator that the trouble has been cleared and that the premises are ready to be returned to night protection. The operator thereupon dials a connection with the subscriber's premises, in a manner to be described hereinafter, and operates his switch KB to the night position and his switch KO to the Operate position. This places ground potential from terminal 121 on the B Operate terminals and energizes relay LTB, which thereupon locks up through make contacts LTB3. The circuit extends from ground terminal 121 through conductor 143, switch contacts KO2, switch contacts KB1, a conductor 153, the B Operate terminal of the operator's keyboard (Fig. 7), conductor 127, the B Operate contact and wiper arm of the selector switch, the B Operate terminal of the line terminal unit and the conductor 89 to the coil of relay LTB. The net result of operating the switches KB and KO as described is to put ground potential on the coil of relay LTB. With relay LTB operated and locked up, the line terminal unit is in its night protection condition and the selector may be released, as will be described hereinafter.

Opening

At a scheduled time the line terminal unit is to be set into a pre-opening condition in which the subsequent opening of the subscriber's premises will not result in the transmission of an alarm signal but instead the transmission of an opening signal. The conditioning of the line terminal unit for pre-opening may be effected by the program device 38 or by the operator or dispatcher's keyboards 34 or 35. This first involves connecting the central station to the line terminal unit through the selector and then conditioning the line terminal unit relay so that the relays will be in the following conditions:

| | |
|---|---|
| LTA | deenergized |
| LTB | energized |
| LTC | energized |
| LTD | deenergized |
| LTE | deenergized |

The only difference between the pre-open condition and the night protection condition is that in the night protection condition relay LTC is deenergized. Thus to go from night to pre-open, relay LTC must be energized.

Energization of relay LTC requires application of ground potential to the C Operate terminal. Considering the keyboard of Fig. 7, the switch KO should be moved to its "Operate" position and the switch KC to its "Opening" position. A circuit will then be completed (in this simplified arrangement) from ground terminal 121 through conductor 143, switch contacts KO2, switch contacts KC1, a conductor 154, the C Operate terminal of Fig. 7, conductor 128, the selector C Operate contact and wiper arm, the line terminal unit C Operate terminal and conductor 90 to the LTC relay coil. Relay LTC, upon energization, locks up through its front contacts LTC3. The program device 38 acts in the same way to energize relay LTC.

When the subscriber enters his premises, opening of the entrance door causes energization of relay SSA which thereupon locks up through its SSA1 contacts. Energization of relay SSA results in energization of relays LTA and LTD, resulting in turn in the energization of relay LTE which locks up through its make contacts LTE3. Operation of relay LTE causes the line finder to connect the line terminal circuit to the translator, as previously described. In the translator the relays W, X and Y are deenergized because of the conditions of relays LTD, LTC and LTB, respectively. Ground potential is applied to terminal S through contacts 104" and LFR1 so that relay P will energize after its short time delay.

Upon energization of relay P, ground potential is applied to translator "opening" output terminal O through a circuit extending from terminal S through conductor 146, normally open contacts $P_2$, normally closed contacts $Q_3$, normally closed contacts $W_2$, normally closed contacts $X_2$, normally closed contacts $Y_3$ and a conductor 155 to terminal O. Application of ground potential to conductor 155 also completes an energizing circuit for relay O which picks up and thereupon locks up through its normally open contacts $O_4$.

The energization of relay O closes normally open contacts $O_3$ thereof thereby energizing the Q relay. The closing of normally open contacts $O_1$ applies ground to the CO and C Operate terminals, whereby the LTC relay remains energized. Closing of normally open contacts $O_2$ applies −24 volts to the BO and B Operate terminals, whereby the LTB relay deenergizes, thereby reversing the polarity of the voltage applied to line DW1. As the current on line DW1 passes through zero, relay SSA becomes deenergized, thereby permitting the LTA and LTD relays to drop out.

Since the subscriber's subset is now in its day protection condition, and since the line terminal unit is similarly in the day condition (the next logical condition), except for relay LTE, the translator is ready to be released. This is effected as previously described, by applying the reset signal to relay RC. The sequence of operations is the same as previously described for the release of the line finder and translator.

At the central station the time of opening may be checked against the scheduled time, as in the case of a closing, and, if late, the subscriber may be contacted. An early opening is, of course, received as an alarm signal since the line terminal unit will not be conditioned for pre-opening.

*Late closing check*

At the end of the scheduled time interval for closing a check is made to determine that the subscriber has in fact closed his premises and established protection. Again, the subscriber may leave his premises and forget to close, leaving him without protection. This check may be carried on under the control of program device 38 or may be carried on by the operator. For convenience, the latter procedure will be described.

The operate switch KO is moved to its "Operate" position, closing switch contacts KO2 and opening switch contacts KO1. Opening of contacts KO1 removes the ground normally applied to the keyboard Reset terminal through conductor 144. Closing of contacts KO2 applies ground to one side of each of switch contacts KML1, KML2, KB1 and KC1. Opening of contacts KO3 permits functioning of the dial contacts which are normally shunted out.

Relay SR of the selector is energized through a circuit extending from ground terminal 121 through conductor 143, dial contacts 132', a conductor 156, the keyboard Dial terminal, conductor 131, the selector Dial terminal, the coil of relay SR, and conductor 139 to +24 volt D.C. terminal 138. When the operator actuates dial 132, this circuit is successively opened a number of times equal to the number dialed, as in the usual dial telephone arrangement. For operating convenience, however, the dial 132 will usually be slow.

Each time the ground return circuit of relay SR is opened by a dial pulse, back contacts SR1 close and thus ground selector switch coil 132, causing the latter to energize. When the dial contacts 132' close again, relay SR energizes, opening back contacts SR1. This allows selector coil 137 to deenergize and thus step the selector wiper arms one position. In this way the selector wiper arms move as many positions as there are dial pulses and therefore end up on the selector contacts associated with the line terminal unit which it is desired to contact. The selector off normal contacts 137" close when the selector wiper arms are off their home contacts.

After the dialing operation is complete, the keyboard circuits of Fig. 7 are connected through the selector wiper arms and contacts of Fig. 8 with the desired line terminal unit. For convenience, there are illustrated direct wire connections between Figs. 7 and 8, shown by the six conductors 126–131. While such an arrangement is certainly feasible since these connections are shared by many subscribers, it is more desirable to use a suitable multiplexing arrangement so as to permit more efficient use of wire facilities. In such case a switching and signalling arrangement of the type shown in Figs. 12, 13 and 14 may be used.

After connection of the operator's keyboard to the line terminal unit, the locking switches KDN and KTN are operated to their positions Day and Test, respectively. The non-locking switches KL and KC are momentarily operated manually to their Late and Closing positions, respectively. Assuming that the line terminal unit is in its day condition, only relay LTC will be energized. Closing of switch contacts KC2 puts +24 volts on the C Operate terminal of the line terminal unit through a circuit extending from +24 volt D.C. terminal 120 through a conductor 157, contacts KC2, conductor 154, the keyboard C Operate terminal, conductor 128, conductor 135, and the selector C Operate contacts and wiper arms. Application of +24 volts on the C Operate terminal of the line terminal unit causes relay LTC to drop out. Since both relays LTB and LTC are now deenergized, the current over line DW1 to the subscriber's premises drops to zero.

The test battery plus terminal 122 is connected to ground terminal 121 through a circuit extending from terminal 122 through a conductor 158, contacts KDN1 and conductor 142 to ground terminal 121. The test battery minus terminal 124 is now at full test battery voltage with respect to ground, which might be, for example, 45 volts. This −45 volts is applied to the keyboard unit D Operate terminal (and hence to the line terminal unit D Operate terminal) through a circuit extending from terminal 124 through conductor 159, contacts KDN2, contacts KTN1, contacts KL5, and a conductor 160 to the D Operate terminal. This −45 volts appears on the line terminal unit D Operate terminal (preferably by completing a relay circuit for a local supply, not shown, at the district station) and is applied to the line DW1 through a circuit extending from the D Operate terminal through conductor 95, back contacts LTC2, back contacts LTB2, and winding 53 of relay LTA. Relay LTA remains balanced since equal current flows through its winding 53' to ground terminal 74 through resistor 76', conductor 76 and conductor 75. This test voltage of −45 volts is twice the magnitude of the normal day voltage of −24 volts, and its application to the subscriber's subset causes relay SSA to energize and lock in through contacts SSA1.

Energization of relay SSA causes relays LTA, LTD and LTE to energize. Relay LTE locks in through its make contacts LTE3 and applies ground potential to the Start terminal through make contacts LTE2, summoning the line finder as previously described.

Since the switch KL is only momentarily operated, the −45 volts is only momentarily applied to line DW1. When this −45 volts is removed upon opening of contacts KL5, the current on line DW1 drops to zero, dropping out in turn relays SSA, LTA and LTD. This will leave only relay LTE of the line terminal unit energized, relays LTA, LTB, LTC and LTD being deenergized. In the translator the relays W, X and Y (the D Read, C Read and B Read relays) will be energized. When the translator S terminal is grounded through contacts LFR1 and 104", relay P picks up. As explained previously, relay P is of the slow-to-operate type so that relays W, X and Y will be energized before relay P picks up.

Upon pick up of relay P, ground will be applied to the translator momentary and late closing output terminals M and L. One of the circuits extends from terminal S through conductor 146, normally open contacts $P_2$, normally closed contacts $Q_3$, normally open contacts $W_2$ and conductor 150 to terminal M. The other circuit extends from terminal S through conductor 146, normally open contacts $P_2$, normally open contacts $X_1$, normally open contacts $Y_1$, and a conductor 161 to terminal L.

Application of ground potential to terminal M is only momentary since relay L energizes upon application of ground potential to conductor 161. Relay L locks up through normally open contacts $L_4$ thereof. Simultaneous opening of the normally closed $L_4$ contacts opens the locking circuit for relay M. Closing of normally open contacts $L_3$ energizes relay Q, thereby opening the normally closed contacts $Q_2$ and deenergizing relay P. Deenergization of relay P opens contacts $P_2$, removing ground from conductor 150. The normally open contacts $L_1$ close and apply ground to the CO terminal, causing the LTC relay to energize. The X relay, which reads the condition of the LTC relay, deenergizes as previously described. This opens the $X_1$ contact, thereby opening the alternative path to ground from terminal M, conductor 150, contacts $W_2$, contacts $X_1$ (now open), contact $Y_1$, conductor 161, contacts $L_4$, conductor 146, start terminal S, conductor 110, LFS terminal, contact LFR1, contact 104", and terminal 109.

If desired, transmission of a momentary signal may be delayed slightly so that when ground is applied to terminal M for only a short time, no signal will be transmitted to the central station.

Closing of normally open contacts $L_2$ puts −24 volts on the BO and B Operate terminals, the circuit extending from −24 volt terminal 117 through conductor 149, normally open contacts $L_2$, normally closed contacts $T_2$, and normally closed contacts $Z_2$ to terminal BO. Application of −24 volts to the BO and B Operate terminals causes relay LTB to remain deenergized.

The translator, having completed its function of reporting that the premises have not, in fact, closed, it is ready to drop out relay LTE, thereby restoring the line terminal unit to its day condition and releasing the line finder. This is accomplished by applying the reset signal to the relay RC, as previously described.

Upon receipt of a late closing signal at the central station, the subscriber may be contacted by telephone or a guard may be dispatched, as deemed appropriate.

The connection from the operator's keyboard to the line terminal unit is released by moving the KO switch to its bottom position, thus applying ground potential to the selector Reset terminal through a circuit extending from ground terminal 121 through conductor 143, contacts KO1, conductor 144, the keyboard Reset terminal and conductor 130 to the selector Reset terminal. This energizes selector coil 137 through contacts 137" and 137', causing the selector switch arms to step around to their home position at which the selector off-normal contacts 137" open.

If the line terminal unit had been in the night condition, relay LTB would have been energized at the start of the late closing check instead of relay LTC. With relay LTB energized, the connection from the D Operate terminal would be open at back contacts LTB2, whereby the −45 volts would not be applied to the line DW1, relay LTE would not be energized and no late closing signal would be transmitted by the translator.

*Testing*

In many protection situations it is desirable periodically to test the integrity of the protection circuits during the night condition. For this purpose, positive test battery (+45 volts) may be applied to the line DW1; then if the circuits are intact, relay SSA will become energized and initiate an alarm signal. The operator (or the program device) contacts the appropriate line terminal unit by dialing as described previously.

The test battery minus terminal is grounded by operating switch KDN to the bottom position so that a circuit will be completed from terminal 124 through conductor 159, contacts KDN4, and conductor 142 to ground terminal 121. A circuit will be completed to apply the full test battery voltage, e.g., 45 volts, from terminal 122 to the line DW1; this circuit extends from terminal 122 through conductor 158, contacts KDN3, contacts KTN1 (switch KTN being operated to its up position for this purpose), contacts KL2 (switch KL being operated to its up position for this purpose), and then through the parallel path to conductor 162, one leg of which is the shunt resistor 162' and the other leg is the test meter 162", and contact KL4, the keyboard Test terminal; conductor 126, the selector circuit Test terminal, conductor 133, the selector Test contact and wiper arm, the line terminal unit Test terminal, and conductor 96 to line DW1.

If the protection circuit is in proper condition, relay SSA will energize and lock up, resulting in transmission of an alarm signal as described previously. If the relay SSA does not pick up, a momentary signal will be transmitted instead of an alarm signal because, during the short interval that the test voltage appears on line DW1, relay LTA will be unbalanced. The unbalance time is insufficient to transmit an alarm signal.

Upon transmisison of an alarm signal as a result of the test, the translator transfers the line terminal unit to day condition and releases itself. The operator thereupon resets the line terminal unit to night condition by releasing relay LTC and energizing relay LTB. Relay LTC is deenergized by operating switch KC to its down or closing position, applying +24 volts to the top of the coil of relay LTC from the +24 volt terminal 120. The circuit extends from terminal 120 through contacts KC2, conductor 154, the keyboard C Operate terminal and the selector circuit to the line terminal unit C Operate terminal and from thence to relay LTC.

Relay LTB is energized by application of ground potential to the line terminal unit B Operate terminal through a similar circuit extending from ground terminal 121 through contacts KO2, contacts KB1, conductor 153, the keyboard B Operate terminal and the selector circuit. Upon resetting the line terminal unit to night condition, the selector is released as described previously. Upon energization of relay LTB the +24 volt night potential is again applied to line DW1. As the current through line DW1 passes through zero, relay SSA is released.

In setting up the regular schedule program device 38, a circuit similar to that of Fig. 7 may be provided in which the switches of Fig. 7 are relay operated and the relays are in turn operated by the business machine output.

*Emergency operation*

The communication channel 24 between the substation 25 and the central station 27 will normally be duplicated for reliability of operation. However, should contact be lost between the substation and the central station despite such redundancy, it is desirable that the substation be able to operate as a manned central station. For this purpose each of the translator output terminals may be connected to a lamp or other local signalling device at the substation 25 so that an operator will be able to ascertain the occurrence of any situation requiring some form of action. Similarly, the line terminal units may each be provided with a lamp or other device which will be energized when the LTE relay is energized so that the operator will be able to ascertain which subscriber is concerned in any situation. Such a lamp is shown at 99' in Fig. 4. The energizing circuit for the lamp 99' extends from ground terminal 74 through conductor 75, a conductor 99", lamp 99', a contact position marked Lamp in the Fig. 5 selector switch, a Lamp wiper arm of the selector switch to +24 volt D.C. terminal 108. A similar lamp connected to a corresponding selector switch contact position will be provided for each line terminal unit. The operator may also be able to operate the selector locally and may be provided with a local circuit of the type shown in Fig. 7 so as to be able to control the line terminal units as required.

In order to provide against failure of the automatic equipment at the central station, lamps or other signalling devices may be provided at the central station so that the conditions of the translator output terminals may be observed directly by the central station operator. Similarly, subscriber identifying equipment may be provided so that the central station operator may ascertain directly which subscriber is involved in any situation.

*Transmission of signals*

The transmission of signals from the substation to the central station may be effected in any convenient manner. The simplest way, of course, would be to provide an individual circuit for each signal. In such an arrangement, the communication channel 24 would be provided with an independent circuit for each of the translator output terminals and for the Reset signal, an independent circuit for each of the selector terminals under the various operating conditions afforded by the keyboard of Fig. 7, and a common circuit for identifying the subscriber signalling to the central station. Such an arrangement would not be as efficient as might be desired, but would nevertheless represent a substantial saving in wire facilities because of the large number of subscribers using these common trunking facilities. Moreover, since these lines could be of voice grade quality rather than the customary low frequency grade line, signalling over a long distance between the substation and the central station would be possible. Circuit problems, among other things, limit the practical connecting distance between a subscriber and the central station and while these limitations would still apply as between the subscriber and the substation, they would not apply between the substation and the central station.

It will, nevertheless, be desirable to minimize the signalling circuit requirements between the substation and central station. The absolute minimum would be a single two-way circuit, but it is preferable to have four one-way circuits, two of which are for emergency use in the event of failure of the primary circuits. Such an arrangement requires some form of multiplexing, many suitable forms of which are well known in the art.

A suitable arrangement for the transmission of data, including subscriber identification, from the substation to the central station will now be described in connection with Figs. 10 and 11.

Referring now to Fig. 10, there is shown, at the left, equipment provided at the substation or district central station 25 and, at the right, equipment provided at the main central station 27. These stations are joined by leased line 24'. At the upper left of Fig. 10 are shown a series of terminals: home, 1, 2 . . . 10; each of these represents an additional line finder selector switch contact, one being provided for each set of subscriber contacts. Thus, if the line finder switch contacts of Fig. 5 represent subscriber No. 3, then an additional contact, the 3 contact of Fig. 10, would be added. A corresponding selector wiper arm IDN would also be provided. The arm IDN is adapted to ground successively the contacts 1, 2, 3, etc., as the line finder switch steps around.

Each of the contacts 1, 2, 3, . . . 10, is connected to a respective one of tone generators TG1, TG2 . . . TG10, and the tone generators are in turn connected to the line 24'. Each of the tone generators produces a unique frequency output which is transmitted over the line 24' and is used to energize a corresponding one of a group of tone detectors TD1, TD2, . . . TD10. The tone detectors are constructed so as to respond only to the output signal of one tone generator and hence are, in effect, highly tuned band pass filters. Each of the tone detectors TD1–TD10 is connected to a corresponding relay CS1–CS10 which is provided with a corresponding one of normally open contacts CS1'–CS10'. Closing of one of contacts CS1'–CS10' means that the corresponding subscriber's subset is signalling. This arrangement affords identification for only 10 subscribers, but it will be appreciated that identification for any convenient number may be had by using combinations of the tone outputs of the generators TG1–TG10, together with corresponding tone detectors and relays.

In the lower left of Fig. 10 are shown terminals T, O, C, A, M and L which are the same as the correspondingly labeled output terminals of Fig. 6. These terminals are connected to respective ones of tone generators TG11–TG16 which afford unique tone outputs which are applied to line 24' and pass through corresponding tone detectors TD11–TD16 for energizing respective ones of relays CS11–CS16 having normally open contacts labeled Trouble, Opening, Closing, Alarm, Momentary and Late Closing, respectively.

In the transmission of signals from the substation to the central station, one of the contacts CS1'–CS10' will close, indicating the subscriber involved, and one of the other contacts will close, indicating the type of occurrance. For example, closing of contacts CS4' and Alarm will signal an alarm condition for subscriber No. 4. Closing of these contacts may illuminate appropriate lamps. As explained in connection with Figs. 1 and 2, information as to the time and date may be added and this information together with the closing of the contacts may be supplied to the general file recording device 30 and to the operator's and dispatcher's card punches 31 and 32.

Tone generator TG17, which provides a distinctive signal frequency, is located at the central station and is energized by closing of a switch RCS. Switch RCS may be closed manually or automatically after receipt of a signal. A corresponding tone detector TD17 is provided at the substation and its output is applied to relay RC of Fig. 6 for releasing the line finder and translator after receipt of a signal. When buffer storage is used, storage of a signal after its receipt at the central station may be used as a trigger to close switch RCS.

The tone generators and tone detectors may be of any suitable type, although the resonant reed type is especially desirable from a stability standpoint.

As shown in Fig. 11, each of the tone generators TG1–TG16 has two output terminals, one, labeled Output, being connected to a conductor 163 and the other being labeled Ground and being connected to a conductor 164. The tone generators TG1–TG16 have two input terminals, one being labeled B+ and being connected to a common B+ supply conductor 165, and the other being labeled Control. Each of the Control terminals of TG1–TG10 is connected to a respective one of contact points 1–10, while each of the Control terminals of TG11–TG16 (not shown in Fig. 11) is connected to a respective translator output terminal.

When the line finder contacts a line terminal unit having an ungrounded stop terminal, relay LFR deenergizes, stopping the line finder selector switch. Back contacts LFR2 (Fig. 11) thereupon close, directly connecting the B+ and Control terminals of the corresponding tone generator. This causes the tone generator output signal to appear on the output terminals thereof, for example, by shorting out a high value resistance in the tone generator oscillator tube plate circuit. This output signal is applied to line 24' through conductors 163 and 164 and a telephone type repeat coil 166. The arrangement shown is slightly different than in Fig. 10, since in the latter ground potential would be applied to the Control terminal to energize the tone generator.

Application of ground potential to a translator output circuit similarly energizes a corresponding one of the tone generators TG11–TG16, in this case by applying ground to an appropriate point in the oscillator circuit.

In order to afford more economical use of wire facilities, signalling from the central station to the substation is preferably effected through a circuit such as the one shown in Figs. 12, 13 and 14. Referring first to Fig. 12, there is shown equipment provided at the central station in lieu of the circuit shown in Fig. 7. This equipment includes a series of tone generators ATG1–ATG14, which may be of the same type as the tone generators of Fig. 11. Each of these tone generators provides a unique frequency when its control terminal is connected to B+ conductor 170. The output tone signals are supplied to communication channel 24'' through common conductors 171 and 172 and a telephone type repeat coil 173.

Activation of any particular tone generator is effected by closing the appropriate one of the switches provided between the B+ conductor 170 and the individual tone generators. For certain operations, more than one tone generator will have to be operated at the same time. These switches are provided instead of the manually operated switches of Fig. 7. The correspondence between the switches of Figs. 7 and 12 is shown by the following table:

| Fig. 12 | Fig. 7 | |
|---------|--------|---|
| AKO     | KO     | |
| A132'   | 132'   | |
| AKML1   | KML    | upper position |
| AKML2   | KML    | lower position |
| AKB1    | KB     | upper position |
| AKB2    | KB     | lower position |
| AKC1    | KC     | upper position |
| AKC2    | KC     | lower position |
| AKL     | KL     | upper position |
| AKL5    | KL     | lower position |
| AKTN1   | KTN    | upper position |
| AKTN2   | KTN    | lower position |
| AKDN    | KDN    | upper position |
| A'KDN   | KDN    | lower position |

While the Fig. 12 switches may be manually operated, they may also be operated automatically by the regular schedule program device 38. If the device 38 is of the type described which provides a punched tape output, particular punched combinations can be used to operate one or more of the Fig. 12 switches as required. The A132' dial contact corresponds to the 132' dial contact of Fig. 7 and causes the selector to provide connection to the appropriate line terminal unit. In order to dial a particular number, the dial contact A132' will be operated appropriately.

Signals transmitted over the channel 24'' to the substation (Figs. 13 and 14) are received in a telephone type repeat coil 174 and are distributed to a series of tone detectors ATD1–ATD14 by conductors 175 and 176. Each of the tone detectors is constructed to respond solely to the tone signal output of the corresponding one of the tone generators ATG1–ATG14. Each of the tone detectors, except ATD2, is provided with a pair of normally open contacts which are closed when the appropriate tone signal is received. The tone detector ATD2 is provided with normally closed contacts B132' which open when a tone signal from tone generator ATG1 is received.

Terminals 119', 120', 121', 122', 123' and 124' correspond, respectively, to terminals 119, 120, 121, 122, 123 and 124 of Fig. 7. The terminals B Operate, C Operate, D Operate and Test correspond to similarly designated terminals of Fig. 8. Other elements of Figs. 13 and 14, which bear the same reference characters found in Figs. 7 and 8, perform corresponding functions.

Contacts BKO of tone detector ATD1 control a relay CKO, the energizing circuit for which extends from +24 volt terminal 120' through conductor 177, the coil of relay CKO, contacts BKO, and conductor 178 to ground terminal 119'. Relay CKO has normally closed contacts CKO1 and CKO3, which correspond to switch contacts KO1 and KO3 and normally open contacts CKO2, which correspond to switch contacts KO2.

In order to connect the central station to a particular line terminal unit through the selector switch of Fig. 8, switch AKO is closed, resulting in energization of tone detector ATG1 and operation of relay CKO. The resulting opening of contacts CKO3 removes a short around contacts B132' to permit dialing of a number, while opening of contacts CKO1 prevents the selector switch reset function from taking place when selector off normal contacts 137'' close. Subsequent repeated opening and closing of contacts G132' under control of tone generator ATD2 will operate the selector switch coil 137 in the manner previously described to contact the desired line terminal unit. When it is desired to break off contact and restore the selector switch to its home position, switch AKO is released, dropping out relay CKO. Closing of contacts CKO1 applies ground potential to coil 137 through contacts 137' and 137'' to return the selector to home position as previously described.

Contacts BLK, BKDN and B'KDN of tone detectors

ATD9, ATD13 and ATD14, respectively, control relays CKL, CKDN and C'KDN, respectively. Relay CKL has normally closed contacts CKL1 and CKL3 and normally open contacts CKL2 and CKL4. Relay CKDN has normally closed contacts CKDN1 and CKDN2. Relay C'KDN has normally closed contacts CKDN3 and normally open contacts CKDN4.

Except for the operations of causing the selector switch to contact a line terminal unit and releasing the selector switch to release the line terminal unit, the circuit of Figs. 13 and 14 is wired and operates in the same way as the circuit of Fig. 7 to apply appropriate potentials to the B Operate, C Operate, D Operate and Test terminals. The corespondence between the switching contacts of Figs. 13 and 14 and the switch operated contacts of Fig. 7 is shown by the following table:

| Figs. 13 and 14 | Fig. 7 |
| --- | --- |
| CKO2 | KO2 |
| BKML1 | KML1 |
| BKML2 | KML2 |
| BKB1 | KB1 |
| BKB2 | KB2 |
| BKC1 | KC1 |
| BKC2 | KC2 |
| CKL1 | KL1 |
| CKL2 | KL2 |
| CKL3 | KL3 |
| CKL4 | KL4 |
| BKL5 | KL5 |
| BKTN1 | KTN1 |
| BKTN2 | KTN2 |
| CKDN1 | KDN1 |
| CKDN2 | KDN2 |
| CKDN3 | KDN3 |
| CKDN4 | KDN4 |

Since the meter 162″ is located at the substation in the Figs. 13–14 circuit, meter observations will have to be made at the substation unless suitable telemetering equipment is provided to transmit the meter readings to the central station.

As mentioned previously, the signals involved in burglar alarm service are, in general, more complicated than those employed in other forms of electric protection service. However, the principles involved are generally applicable to other forms of electric protection service, such as watchman's reporting, fire alarm, waterflow detection and industrial supervision. In a watchman's reporting service, for example, five signals are usually involved, these being a start signal, a route signal, a finish signal, an energizing signal and an alarm signal, the alarm signal actually being the absence of another signal at a predetermined time. In waterflow detection, there are usually three signals, these being trouble, alarm and rewind.

As used in the appended claims, the term "intermediate station" refers to a substation or district central station which will normally be located relatively close to the associated individual places, while the term "remote station" refers to a station of the type which is usually styled a "central station" and which may be located many miles from the intermediate station or stations with which it is associated. It should be understood, of course, that the term "remote station" is also intended to include establishments other than strict central stations, for example, police stations, fire headquarters or guard stations where appropriate provision is made for responding to alarm signals. While intermediate stations usually will not be manned, in some cases they may be, especially for service during emergencies. Thus it will usually be desirable to provide at the intermediate stations equipment by which operators may be apprised of protection situations at the various individual protected places and by which they may initiate appropriate signals even though, under normal conditions, no operators may be present. Where no operators are present at an intermediate station, it will normally be desirable to provide protection equipment for signalling to the central station when an effort is made to attack or otherwise compromise the integrity of an intermediate station.

While the invention has been described in connection with specific embodiments and specific steps, and in specific uses, various modifications thereof will occur to those skilled in the art without departing from the spirit and scope of the invention as set forth in the appended claims.

What is claimed is:

1. A signalling method for protecting a plurality of individual places, comprising the steps of providing at each of said individual places an electrical signal representative of the occurrence of a protection situation at said respective individual places, transmitting said electrical signals to a common intermediate station, producing one of a group of individual electrical conditions at said intermediate station for each of said individual places, comparing a received electrical signal with the corresponding electrical condition, generating at said intermediate station an electrical signal indication representative of receipt of said receive electrical signal, representative of said comparison thereof and uniquely representative of the individual place at which said received electrical signal was provided, transmitting said electrical signal indication to a remote station, using said electrical signal indication at said remote station to register the occurrence of a protection situation and the results of said comparison and to identify the particular individual place at which said protection situation occurred, and producing another one of said group of electrical conditions at said intermediate station for said particular individual place.

2. A signalling method for protecting a plurality of individual places, comprising the steps of providing at each of said individual places an electrical signal representative of the occurrence of a protection situation at said respective individual places, transmitting said electrical signals to a common intermediate station, producing one of a group of individual electrical conditions at said intermediate station for each of said individual places, comparing a received electrical signal with the corresponding electrical condition, generating at said intermediate station an electrical signal indication representative of receipt of said received electrical signal, representative of said comparison thereof and uniquely representative of the individual place at which said received electrical signal was provided, transmitting said electrical signal indication to a remote station, using said electrical signal indication at said remote station to register the occurrence of a protection situation and the results of said comparison and to identify the particular individual place at which said protection situation occurred, producing another one of said group of electrical conditions at said intermediate station for said particular individual place, and periodically changing said individual electrical conditions in accordance with a schedule of protection conditions at said individual places.

3. A signalling method as set forth in claim 2 in which the periodic change in said individual electrical conditions is effected at said intermediate station by generating control signals at said remote station and transmitting said control signals to said intermediate station.

4. A signalling method as set forth in claim 3 in which said control signals are generated automatically.

5. A signalling method for protecting a plurality of individual places, comprising the steps of using the occurrence of a protection situation at each of said individual places to provide at said respective individual places an electrical signal representative of the occurrence of said protection situation, transmitting said electrical signals to a common intermediate station, producing one of a group of individual electrical conditions at said intermediate station for each of said individual places, comparing a received electrical signal with the corresponding electrical condition, generating at said intermediate station an electrical signal indication representative of receipt of said received electrical signal, representative of said comparison thereof and uniquely representative of the individual place at which said received electrical signal was provided, transmitting said electrical signal indication to a remote station, using said electrical signal indication at said remote station to register the occurrence of a protection situation and the results of said comparison and to identify the particular individual place at which said protection situation occurred, and producing another one of said group of electrical conditions at said intermediate station for said particular individual place.

6. A signalling method for protecting a plurality of individual places, comprising the steps of providing at each of said individual places an electrical signal representative of the occurrence of a protection situation at said respective individual places, transmitting said electrical signals to a common intermediate station, producing one of a group of individual electrical conditions at said intermediate station for each of said individual places, comparing said received electrical signals with the corresponding electrical conditions, generating at said intermediate station an electrical signal indication representative of receipt of a first one of said electrical signals, representative of said comparison thereof and uniquely representative of the particular individual place at which said first received electrical signal was provided, transmitting said electrical signal indication to a remote station, using said electrical signal indication at said remote station to register the occurrence of a protection situation and the results of said comparison and to identify said particular individual place at which said protection situation occurred, and producing another one of said group of electrical conditions at said intermediate station to correspond to said particular individual place.

7. A signalling method for protecting a plurality of individual places, comprising the steps of generating at each of said individual places an electrical signal representative of the occurrence of a protection situation at said respective individual places, transmitting said electrical signals to a common intermediate station, producing one of a group of individual electrical conditions in each one of a group of individual electrical circuits provided at said intermediate station for each of said individual places, comparing said received electrical signals with the corresponding electrical conditions of the corresponding individual electrical circuits, generating at said intermediate station an electrical signal indication representative of receipt of a first one of said electrical signals, representative of said comparison thereof and uniquely representative of the particular individual place at which said first received electrical signal was generated, transmitting said electrical signal indication to a remote station, using said electrical signal indication at said remote station to register the occurrence of a protection situation and the results of said comparison and to identify said particular individual place at which said protection situation occurred, and producing another one of said group of electrical conditions in said individual electrical circuit at said intermediate station corresponding to said particular individual place.

8. A signalling method as set forth in claim 7 in which the electrical conditions in said individual electrical circuits are periodically changed to correspond to schedules of protection conditions at said protected places.

9. A signalling method as set forth in claim 8 in which control signals are generated at said remote station and are transmitted to said intermediate station to effect said periodic changes in said electrical conditions.

10. A signalling method as set forth in claim 9 in which said control signals are generated automatically.

11. A signalling method for protecting a plurality of individual places, comprising the steps of providing at each of said individual places an electrical signal representative of the occurrence of a protection situation at said respective individual places, transmitting said electrical signals to corresponding individual terminal circuits at a common intermediate station, establishing preselected steady state electrical conditions for individual terminal circuits, each steady state condition corresponding to a particular protection condition of the corresponding protected place, using a first transmitted electrical signal to cause the corresponding terminal circuit to assume a temporary electrical condition, using the assumption of said temporary electrical condition to produce an electrical signal indication representative of the particular protection situation causing the transmission of said electrical signal and uniquely representative of the corresponding individual place, transmitting said electrical signal indication to a remote station, using said electrical signal indication at said remote station to register the occurrence of said protection situation and to identify the particular protected place at which said protection situation occurred, and resetting said corresponding terminal circuit to a steady state electrical condition different from the steady state electrical condition thereof prior to receipt of said transmitted electrical signal.

12. A signalling method for protecting a plurality of individual places, comprising the steps of providing at each of said individual places an electrical signal representative of the occurrence of a protection situation at said respective individual places, transmitting said electrical signals to corresponding individual terminal circuits at a common intermediate station, establishing preselected steady state electrical conditions for said individual terminal circuits, each steady state condition corresponding to a particular protection condition of the corresponding protected place, using a first transmitted electrical signal to cause the corresponding terminal circuit to assume a temporary electrical condition, using the assumption of said temporary electrical condition to produce an electrical signal indication representative of the particular protection situation causing the transmission of said electrical signal and uniquely representative of the corresponding individual place, transmitting said electrical signal indication to a remote station, using said electrical signal indication at said remote station to register the occurrence of said protection situation and to identify the particular protected place at which said protection situation occurred, resetting said corresponding terminal circuit to a steady state electrical condition different from the steady state electrical condition thereof prior to receipt of said transmitted electrical signal, and periodically changing the steady state conditions of said terminal circuits in accordance with the protection conditions of the associated protected places.

13. A signalling method for protecting a plurality of individual places, comprising the steps of providing at each of said individual places an electrical signal representative of the occurrence of a protection situation at said respective individual places, transmitting said electrical signals to corresponding indvidual terminal circuits at a common intermediate station, establishing preselected steady state electrical conditions for said individual terminal circuits, each steady state condition corresponding to a particular protection condition of the corresponding protected place, using a first transmitted electrical signal to cause the corresponding terminal circuit to assume a temporary electrical condition, using the assumption of said temporary electrical condition to produce an electrical signal indication representative of the particular protection situation causing the transmission of said electrical signal and uniquely representative of the corresponding individual place, transmitting said electrical signal indication to a remote station, using said electrical signal indication at said remote station to register the occurrence of said protection situation and to identify the particular protected place at which said protection situation occurred, resetting said corresponding terminal circuit to a steady state electrical condition different from the steady state electrical condition thereof prior to receipt of said transmitted electrical signal, and periodically providing control signals at said remote station and transmitting each of said control signals to a respective preselected one of said terminal circuits thereby to change periodically the steady state conditions of said terminal circuits in accordance with a schedule of protection conditions of the associated protected places.

14. A signalling method as set forth in claim 13 in which said control signals are generated automatically in accordance with a preestablished schedule.

15. A signalling method as set forth in claim 13 in which a special control signal transmitted from said remote station to a selected terminal circuit is used in said terminal circuit to transmit a test signal to the associated individual place to create artificially a desired protection situation at said associated individual place.

16. In an electrical protection system for protecting a group of individual protected places, individual signalling equipment at each of said protected places for creating electrical signals representative of occurrences at said premises, a common station, individual terminal means at said common station for each of said protected places, circuit means for interconnecting said individual signalling equipment and the corresponding terminal means, each of said terminal means having a group of electrical circuits adapted to assume one of a first group of composite electrical conditions each affording an individual steady state condition corresponding to a respective protection situation at the corresponding protected place, means for periodically changing the steady state condition of each of said terminal means, each of said group of electrical circuits being adapted to assume one of a second group of composite electrical conditions in response to receipt of one of said electrical signals, and means responsive to assumption of one of said second group of electrical conditions by one of said individual terminal means for registering receipt of one of said electrical signals and for registering the identity of the corresponding protected place.

17. In a electrical protection system for protecting a group of individual protected places, individual signalling equipment at each of said protected places for creating electrical signals representative of occurrences at said premises, a common station, individual terminal means at said common station for each of said protected places, circuit means for interconnecting said individual signalling equipment and the corresponding terminal means, each of said terminal means having a group of electrical circuits adapted to assume one of a first group of composite electrical conditions each affording an individual steady state condition corresponding to a respective protection situation at the corresponding protected place, means for periodically changing the steady state condition of each of said terminal means, each of said group of electrical circuits being adapted to assume one of a second group of composite electrical conditions in response to receipt of one of said electrical signals, and means responsive to assumption of one of said second group of electrical conditions by one of said individual terminal means for registering receipt of one of said electrical signals.

18. In an electrical protection system for protecting a group of individual protected places, individual signalling equipment at each of said protected places for creating electrical signals representative of occurrences at said premises, a common station, individual terminal means at said common station for each of said protected places, circuit means for interconnecting said individual signalling equipment and the corresponding terminal means, each of said terminal means having a group of electrical circuits adapted to assume one of a first group of composite electrical conditions each affording an individual steady state condition corresponding to a respective protection situation at the corresponding protected place, means for periodically changing the steady state condition of each of said terminal means in accordance with a pre-arranged schedule adjusted in accordance with the protection requirements of said individual protected places, each of said group of electrical circuits being adapted to assume one of a second group of composite electrical conditions in response to receipt of one of said electrical signals, and means responsive to assumption of one of said second group of electrical conditions by one of said individual terminal means for registering receipt of one of said electrical signals and for registering the identity of the corresponding protected place.

19. In an electrical protection system for protecting a group of individual protected places, individual signalling equipment at each of said protected places for creating electrical signals representative of occurrences at said premises, a common station, individual terminal means at said common station for each of said protected places, circuit means for interconnecting said individual signalling equipment and the corresponding terminal means, each of said terminal means having a group of electrical circuits adapted to assume one of a first group of composite electrical conditions each affording an individual steady state condition corresponding to a respective protection situation at the corresponding protected place, means for automatically periodically changing the steady state condition of each of said terminal means in accordance with a pre-arranged schedule, each of said group of electrical circuits being adapted to assume one of a second group of composite electrical conditions in response to receipt of one of said electrical signals, and means responsive to assumption of one of said second group of electrical conditions by one of said individual terminal means for registering receipt of one of said electrical signals and for registering the identity of the corresponding protected place.

20. In an electrical protection system for protecting a group of individual protected places, individual signalling equipment at each of said protected places for creating electrical signals representative of occurrences at said premises, a common station, individual terminal means at said common station for each of said protected places, circuit means for interconnecting said individual signalling equipment and the corresponding terminal means, each of said terminal means having a group of electrical circuits adapted to assume one of a first group of composite electrical conditions each affording an individual steady state condition corresponding to a respective protection situation at the corresponding protected place, means for periodically changing the steady state condition of each of said terminal means in accordance with a pre-arranged schedule, each of said group of electrical circuits being adapted to assume one of a second group of composite electrical conditions in response to receipt of one of said electrical signals, means responsive to assumption of one of said second group of electrical conditions by one of said individual terminal means for registering receipt of one of said electrical signals and the identity of the corresponding protected place, and means responsive to said registration for causing the corresponding terminal means to assume a different one of said first group of electrical conditions.

21. An electrical protection system for producing electrical signal indications at a remote station of occurrences at a group of individual protected places, comprising individual signalling equipment at each of said protected places for generating electrical signals upon the happening of protection occurrences at said respective places, said individual signalling equipment having a plurality of electrical conditions each corresponding to a particular protection condition at the associated protected place, an intermediate station, individual terminal means at said intermediate station for each of said protected places, said individual terminal means having a plurality of electrical conditions each of which corresponds to a particular protection condition at the corresponding protected place, circuit means interconnecting corresponding individual signalling equipment and individual terminal means whereby each of said individual terminal means is caused to assume an appropriate electrical condition upon receipt of an electrical signal, a common translating circuit at said intermediate station for sensing the condition of said individual terminal means and for producing a corresponding electrical signal indication, means responsive to receipt of one of said electrical signals for interconnecting said translating circuit and the particular individual terminal means receiving said electrical signal, means for producing a signal indication uniquely representative of said particular individual terminal means, electrical signal indication responsive means at said remote station for registering receipt of said electrical signal indication, for identifying the individual terminal means condition corresponding thereto and for identifying said particular individual terminal means, and a communication channel interconnecting said intermediate and remote stations for transmitting said generated electrical signal indications to said electrical signal indication responsive means.

22. An electrical protection system for producing electrical signal indications at a remote station of occurrences at a group of individual protected places, comprising individual signalling equipment at each of said protected places for generating electrical signals upon the happening of protection occurrences at said respective places, said individual signalling equipment having a plurality of electrical conditions each corresponding to a particular protection condition at the associated protected place, an intermediate station, individual terminal means at said intermediate station for each of said protected places, said individual terminal means having a plurality of electrical conditions each of which corresponds to a particular protection condition at the corresponding protected place, circuit means interconnecting corresponding individual signalling equipment and individual terminal means whereby each of said individual terminal means is caused to assume an appropriate electrical condition upon receipt of an electrical signal, a common translating circuit at said intermediate station for sensing the condition of said individual terminal means and for producing a corresponding electrical signal indication, means responsive to receipt of one of said electrical signals for interconnecting said translating circuit and the particular individual terminal means receiving said electrical signal, means for producing a signal indication uniquely representative of said particular individual terminal means, electrical signal indication responsive means at said remote station for registering receipt of said electrical signal indication, for identifying the individual terminal means condition corresponding thereto and for identifying said particular individual terminal means, a communication channel interconnecting said intermediate and remote stations for transmitting said generated electrical signal indications to said electrical signal indication responsive means, conditioning means for setting said individual terminal means in preselected conditions, and means for interconnecting said conditioning means and selected individual terminal means.

23. An electrical protection system for producing electrical signal indications at a remote station of occurrences at a group of individual protected places, comprising individual signalling equipment at each of said protected places for generating electrical signals upon the happening of protection occurrences at said respective places, said individual signalling equipment having a plurality of electrical conditions each corresponding to a particular protection condition at the associated protected place, an intermediate station, individual terminal means at said intermediate station for each of said protected places, said individual terminal means having a plurality of electrical conditions each of which corresponds to a particular protection condition at the corresponding protected place, circuit means interconnecting corresponding individual signalling equipment and individual terminal means whereby each of said individual terminal means is caused to assume an appropriate electrical condition upon receipt of an electrical signal, a common translating circuit at said intermediate station for sensing the condition of said individual terminal means and for producing a corresponding electrical signal indication, means responsive to receipt of one of said electrical signals for interconnecting said translating circuit and the particular individual terminal means receiving said electrical signal, means for producing a signal indication uniquely representative of said particular individual terminal means, electrical signal indication responsive means at said remote station for registering receipt of said electrical signal indication, for identifying the individual terminal means condition corresponding thereto and for identifying said particular individual terminal means, a communication channel interconnecting said intermediate and remote stations for transmitting said generated electrical signal indications to said electrical signal indication responsive means, conditioning means at said intermediate station for setting said individual terminal means in preselected conditions, means for interconnecting said conditioning means and selected individual terminal means, conditioning signal generating means at said remote station for operating said conditioning means, and means to apply said generated conditioning signals to said conditioning means.

24. An electrical protection system as set forth in claim 23 in which said conditioning means includes means for generating a test signal for causing the individual signalling equipment at a selected individual place to artificially establish a protection occurrence.

References Cited in the file of this patent

UNITED STATES PATENTS

| | | |
|---|---|---|
| 1,930,525 | Levy | Oct. 17, 1933 |
| 2,236,822 | Hershey | Apr. 1, 1941 |
| 2,762,014 | Anderson | Sept. 4, 1956 |

UNITED STATES PATENT OFFICE

CERTIFICATE OF CORRECTION

Patent No. 2,985,871            May 23, 1961

Philo S. Bemis

It is hereby certified that error appears in the above numbered patent requiring correction and that the said Letters Patent should read as corrected below.

Column 4, line 71, for "is", first occurrence, read -- in --; column 7, line 35, after "Lamp" insert a comma; column 9, line 64, for "the" read -- an --; column 11, line 41, for "operate", each occurrence, read -- Operate --; column 13, line 7, after "from" insert -- the --; column 26, line 66, for "G132'" read -- B132' --; line 75, for "BLK" read -- BKL --; column 30, line 6, after "for" insert -- said --; line 59, for "indvidual" read -- individual --.

Signed and sealed this 17th day of October 1961.

(SEAL)
Attest:

ERNEST W. SWIDER
Attesting Officer

DAVID L. LADD
Commissioner of Patents

USCOMM-DC